US008495646B2

(12) United States Patent
Uchida

(10) Patent No.: US 8,495,646 B2
(45) Date of Patent: Jul. 23, 2013

(54) RESOURCE ALLOCATION SYSTEM, RESOURCE ALLOCATION METHOD AND PROGRAM WHICH FLEXIBLY INTRODUCES A SERVICE

(75) Inventor: Satoshi Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 1226 days.

(21) Appl. No.: 12/354,649

(22) Filed: Jan. 15, 2009

(65) Prior Publication Data

US 2009/0183168 A1 Jul. 16, 2009

(30) Foreign Application Priority Data

Jan. 16, 2008 (JP) ................................ 2008-007035

(51) Int. Cl.
*G06F 9/46* (2006.01)
*G06F 9/50* (2006.01)

(52) U.S. Cl.
USPC ........................................................ 718/104

(58) Field of Classification Search
USPC ........................................................ 718/104
See application file for complete search history.

(56) References Cited

U.S. PATENT DOCUMENTS

| 5,951,633 | A | * | 9/1999 | Polcyn | 718/104 |
| 6,003,061 | A | * | 12/1999 | Jones et al. | 718/104 |
| 7,240,113 | B1 | * | 7/2007 | Barry et al. | 709/225 |
| 2004/0021678 | A1 | * | 2/2004 | Ullah et al. | 345/700 |
| 2005/0044228 | A1 | * | 2/2005 | Birkestrand et al. | 709/226 |
| 2005/0235288 | A1 | * | 10/2005 | Yamakabe et al. | 718/100 |
| 2006/0090162 | A1 | * | 4/2006 | Flores et al. | 718/104 |
| 2006/0095664 | A1 | * | 5/2006 | Wichelman et al. | 711/114 |
| 2008/0005490 | A1 | * | 1/2008 | Shiraki et al. | 711/147 |
| 2008/0022284 | A1 | * | 1/2008 | Cherkasova et al. | 718/104 |
| 2008/0022285 | A1 | * | 1/2008 | Cherkasova et al. | 718/104 |
| 2008/0195450 | A1 | * | 8/2008 | Cho | 705/8 |

FOREIGN PATENT DOCUMENTS

| JP | 2001-282555 A | 10/2001 |
| JP | 2002-202959 A | 7/2002 |
| JP | 2004-199561 A | 7/2004 |
| JP | 2004-246552 A | 9/2004 |
| JP | 2006-236351 A | 9/2006 |
| JP | 2007-122663 A | 5/2007 |
| JP | 2007-200346 A | 8/2007 |

OTHER PUBLICATIONS

Yu, Oliver T.W. etal., Signaling Network Architecture and Transaction Protocols to Support Realtime Connection Rerouting in ATM/B-ISDNs.*
Japanese Office Action for JP2008-007035 Mailed on Mar. 21, 2012.

* cited by examiner

*Primary Examiner* — Eric Coleman

(57) ABSTRACT

A resource allocation system comprising: a resource state monitoring unit which measures a capacity and/or a usage of a computer resource(s) to be managed (referred to below as "managing resource(s)") and an allocation adjustment unit which determines a new amount of allocating resource(s) by using at least one item of information among either of capacity and usage of the managing resource, complying a resource (s) amount demanded to be allocated (referred to below as "demanded resource amount"), wherein the determined resource amount is allocated in response to a request for the resource amount.

20 Claims, 15 Drawing Sheets

FIG. 4

| SERVICE INTRODUCTION NUMBER | COMPARATIVE EXAMPLE | PRESENT INVENTION |
|---|---|---|
| 1 | 200 MACHINES | 200 MACHINES |
| 2 | 200 MACHINES | 200 MACHINES |
| 3 | 200 MACHINES | 200 MACHINES |
| 4 | 200 MACHINES | 150 MACHINES |
| 5 | 200 MACHINES | 100 MACHINES |
| 6 | NOT POSSIBLE | 100 MACHINES |
| 7 | NOT POSSIBLE | NOT POSSIBLE |

FIG. 8

| VM START No. | VM TYPE | COMPARATIVE EXAMPLE | | PRESENT INVENTION MODE 1 | | PRESENT INVENTION MODE 2 | | |
|---|---|---|---|---|---|---|---|---|
| | | ALLOCATION AMOUNT | FREE RESOURCE | ALLOCATION AMOUNT | FREE RESOURCE | FACTOR | ALLOCATION AMOUNT | FREE RESOURCE |
| INITIAL VALUE | | | 8192 | | 8192 | | | 8192 |
| 1 | 1 | 409.6 | 7782.4 | 409.6 | 7782.4 | 1.5 | 512 | 7680 |
| 2 | 2 | 256 | 7526.4 | 256 | 7526.4 | 1.5 | 256 | 7424 |
| 3 | 1 | 409.6 | 7116.8 | 418.1 | 7108.3 | 1.5 | 512 | 6912 |
| 4 | 2 | 256 | 6860.8 | 256 | 6852.3 | 1.5 | 256 | 6656 |
| 5 | 1 | 409.6 | 6451.2 | 428.3 | 6424 | 1.5 | 512 | 6144 |
| 6 | 2 | 256 | 6195.2 | 256 | 6168 | 1.2 | 256 | 5888 |
| 7 | 1 | 409.6 | 5785.6 | 440.6 | 5727.4 | 1.2 | 504.7 | 5383.3 |
| 8 | 2 | 256 | 5529.6 | 256 | 5471.4 | 1.2 | 256 | 5127.3 |
| 9 | 1 | 409.6 | 5120 | 456 | 5015.4 | 1.2 | 512 | 4615.3 |
| 10 | 2 | 256 | 4864 | 256 | 4759.4 | 1.2 | 256 | 4359.3 |
| 11 | 1 | 409.6 | 4454.4 | 475.9 | 4283.5 | 1.2 | 512 | 3847.3 |
| 12 | 2 | 256 | 4198.4 | 256 | 4027.5 | 1 | 256 | 3591.3 |
| 13 | 1 | 409.6 | 3788.8 | 503.4 | 3524.1 | 1 | 448.9 | 3142.4 |
| 14 | 2 | 256 | 3532.8 | 256 | 3268.1 | 1 | 256 | 2886.4 |
| 15 | 1 | 409.6 | 3123.2 | 512 | 2756.1 | 1 | 481.1 | 2405.3 |
| 16 | 2 | 256 | 2867.2 | 256 | 2500.1 | 1 | 256 | 2149.3 |
| 17 | 1 | 409.6 | 2457.6 | 512 | 1988.1 | 1 | 512 | 1637.3 |
| 18 | 2 | 256 | 2201.6 | 256 | 1732.1 | 1 | 256 | 1381.3 |
| 19 | 1 | 409.6 | 1792 | 512 | 1220.1 | 1 | 512 | 869.3 |
| 20 | 2 | 256 | 1536 | 256 | 964.1 | 1 | 256 | 613.3 |

FIG. 14
BEFORE START OF SERVICE
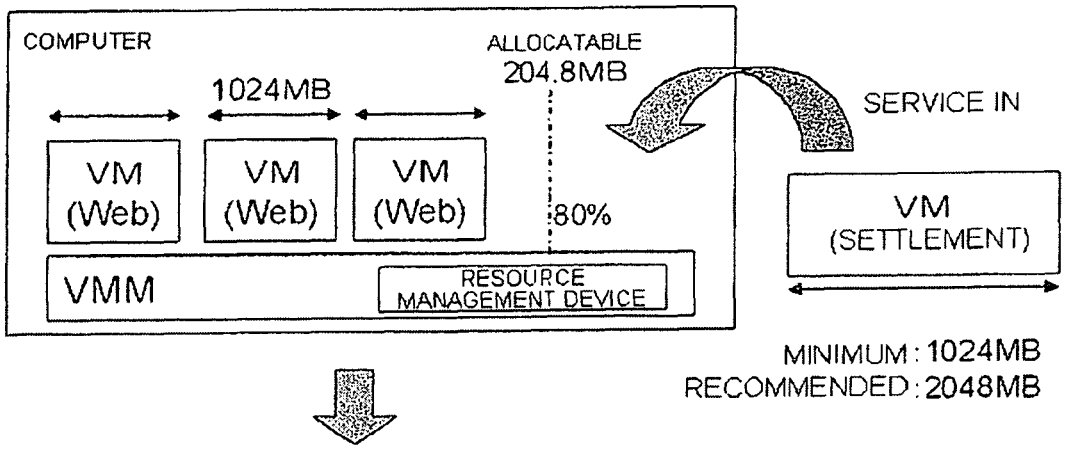
MINIMUM: 1024MB
RECOMMENDED: 2048MB
RESOURCE SECURING BY RECONFIGURATION
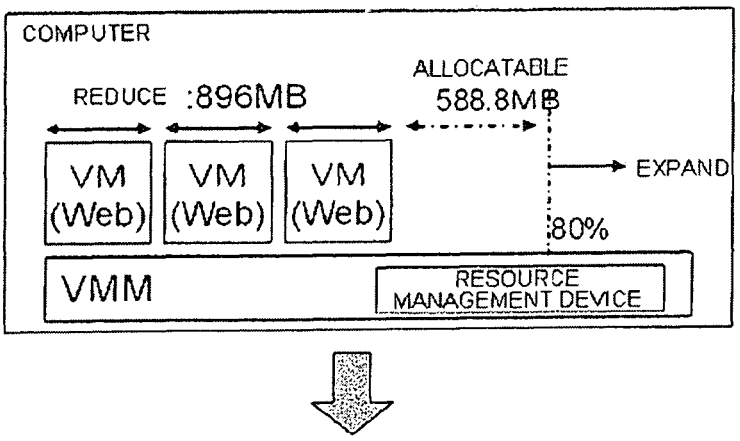
AFTER START OF SERVICE
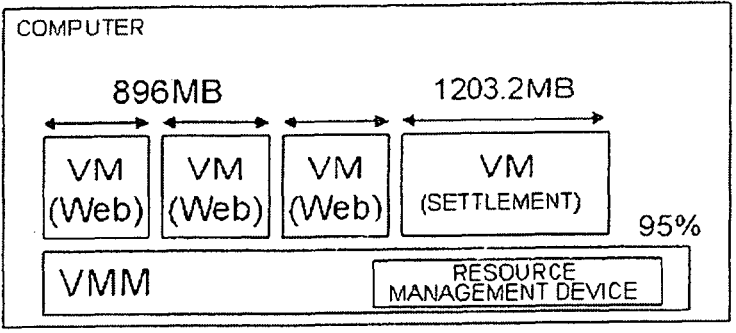

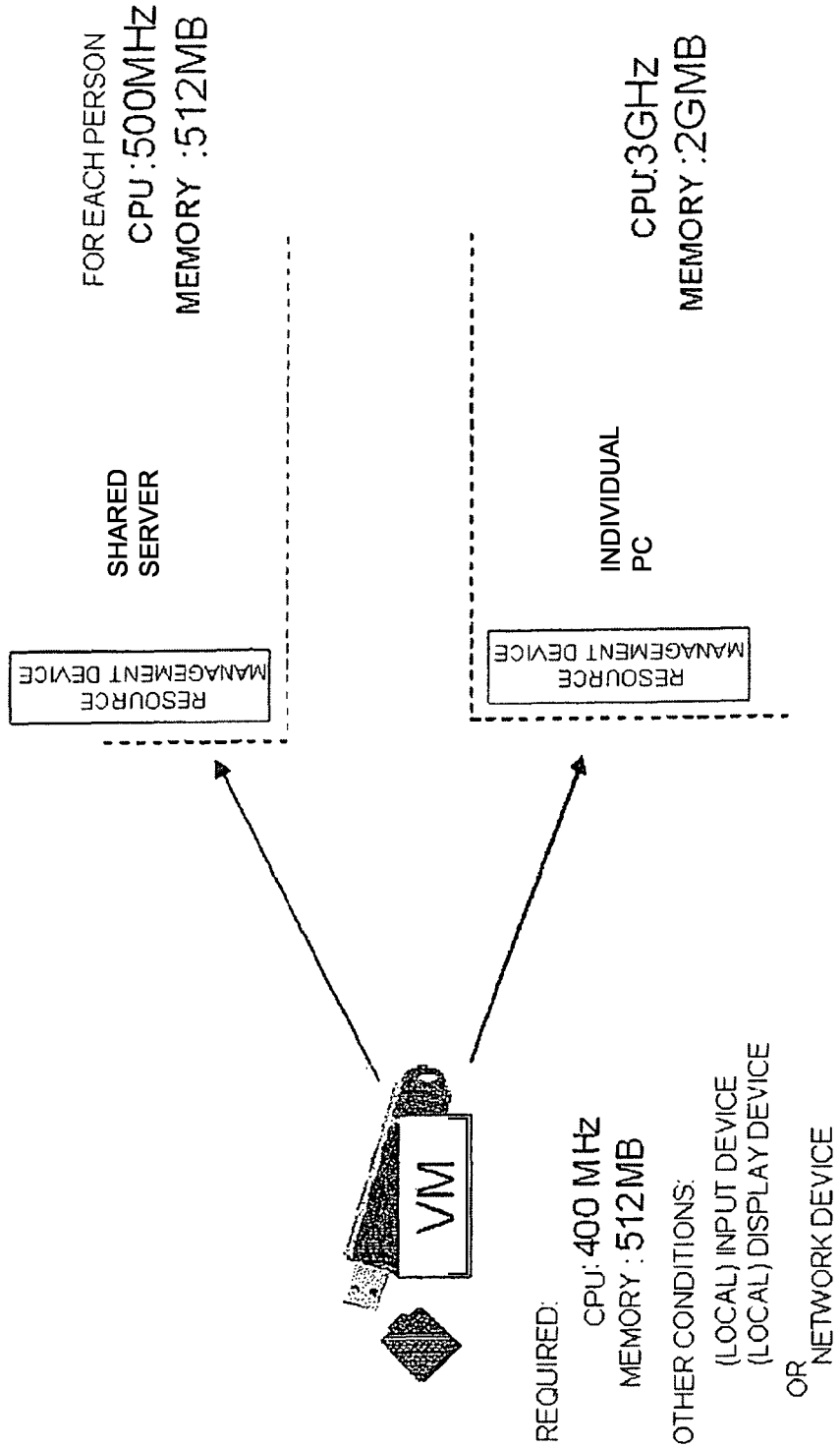

RESOURCE ALLOCATION SYSTEM, RESOURCE ALLOCATION METHOD AND PROGRAM WHICH FLEXIBLY INTRODUCES A SERVICE

This application is based upon and claims the benefit of the priority of Japanese patent application No. 2008-007035 filed on Jan. 16, 2008, the disclosure of which is incorporated herein in its entirety by reference thereto.

FIELD OF THE INVENTION

The present invention relates to a resource allocation system, a resource allocation method, and a resource allocation program, and in particular, to a resource allocation system, a resource allocation method, and a resource allocation program that allocate computer resources adaptively, complying with demands of clients and so on.

BACKGROUND

Patent Document 1 and Patent Document 2 describe examples of resource allocation technology. A virtual computer (machine) system described in Patent Document 1 is composed of a load monitor which measures load of OS (Operating System) on LPARs (logical partitions), a user interface by which a manager sets knowledge related to OS workload of OS, and an adaptive controller which changes degrees of allocating resources by calculating resource allocation rate for each LPAR based on values of the loads and settings and directs the hypervisor to change resource allocation.

In the virtual machine system described in Patent Document 1, LPARs are started at an initial setting. And then, the adaptive controller calculates the resource allocation rate which is within a setting range for each LPAR, so that performance increases based on forecast workloads inputted through the user interface and/or a load measured by the load monitor. Resource allocations are changed by directing the hypervisor to change into calculated resource allocation rate. Therefore, this system can change adaptive resource allocation in response to loads of OSs.

This kind of resource allocation system has a problem that a service to be must be determined in advance. For example, in the virtual machine system of Patent Document 1, computer resources are allocated evenly based on forecast service required amounts for each LPAR, and then, loads are observed and computer resources are adjusted based on the resource load amount. In such systems, there is no consideration for some additional space, for example idle resource amount stocked for allocating new LPARs.

However, services should be run in response to user's demands, and the number of services run is not always fixed. Consequently, resource provisioning system in response to a user's starting demands for service is desirable.

In view of the above description, a resource allocation system that limits resource allocation is proposed. Patent Document 2 is an example of a resource allocation system that limits resource allocation when a shared resource is provided to a plurality of clients.

The system described in Patent Document 2 is composed of a resource provider which encodes restrictions on aggregated usage amount of a resource allocated to one or more clients, and a resource manager that validates and arbitrates requests to allocate resources to the one or more clients by a resource provider based on budgets. The resource manager notifies clients of availability and shortages of resources, to promote compliance with the restrictions encoded in a hierarchical budget(s).

Here, the budget is managed according to a budget limit "L" which is the maximum amount that can be allocated to one client, a budget commit "C" which is the amount of a resource already allocated, and a budget reservation "R" which ensures that a future demand to allocate a resource for one client will likely succeed. A client connected to a budget is provided with a resource amount, which is the budget commit, while adjusting to secure the budget, in a range that does not exceed the budget limit. The budget(s) can be formed in a hierarchy, and by further collecting an aggregation of budgets as one budget, resource management by the budget limit, the budget commit, and the budget reservation, is made possible. By assuring the likelihood of securing a resource by securing the budget and avoiding securing all the resources by the budget limit in this way, an operating environment in which prediction is more feasible is provided, so that more efficient resource management becomes possible.

[Patent Document 1]
 JP Patent Kokai Publication No. JP-P2007-200346A
[Patent Document 1]
 JP Patent Kokai Publication No. JP-P2006-236351A

SUMMARY

The entire disclosures of Patent Documents 1 and 2 are incorporated herein by reference thereto. The following analyses are given by the present invention.

However, there is a problem in that the abovementioned resource allocation system does not have a function of adjusting an allocated resource amount by considering a capacity and/or a usage of a computer resource to be managed (referred to below as "managing resource"). For example, in Patent Document 2, although a resource constraint is provided by the limit, a resource amount, which a client desires, within the constraint if possible, is allocated. Ultimately, adjustment is carried out resource reclaiming for each client only in cases where all of the resource have been secured.

The present invention has been made in view of the abovementioned circumstances and aims to provide a resource allocation system, a resource allocation method, and a resource allocation program, provided with a function of adjusting an allocating resource amount complying a resource securing demand (allocation demand) requested by a service, by considering capacity and/or usage of managing resource(s).

The present invention has been made in view of the abovementioned circumstances. And this present invention aims to provide a resource allocation system, a resource allocation method, and a resource allocation program, provided with a function of adjusting an allocating resource amount complying a resource securing demand (allocation demand) requested by a service, by considering capacity and/or usage of managing resource(s).

Here, the "service" indicates a program or a group of programs executed for a specific purpose.

According to a first aspect of the present invention, there is provided a resource allocation system that comprises: a resource monitoring unit and an allocation adjustment unit. The resource monitoring unit measures a capacity and/or a usage of a computer resource to be managed (referred to below as "managing resource"). The allocation adjustment unit determines a new amount of allocating resource by using at least one item of information among either of capacity and usage of the managing resources complying a resource amount demanded to be allocated (referred to below as "demanded resource amount"), wherein the determined resource amount is allocated in response to the request for the demanded resource amount.

According to a second aspect of the present inventions there is provided a resource allocation method wherein a computer measures capacity or a usage of managing resource, and determines a new amount of allocating resource by using at least one item of information among either of capacity and usage of the managing resources complying the demanded resource amount, and allocates the determined resource amount in response to the request for the demanded resource amount.

According to a third aspect of the present invention, there is provided a program operated in a computer for determining a new amount of allocating resource in response to a request for the demanded resource amount. The program executes on a computer: a monitoring process which measures a capacity and/or usage of managing resources; and an allocation adjustment process which determines the new amount of allocating resource by using at least one item of information among either of capacity and usage of the managing resources complying the demanded resource amount.

The meritorious effects of the present invention are summarized as follows.

According to the present invention, it is possible to adjust an allocation resource amount complying a resource allocation demand from a service, by considering a capacity and a usage of the managing resources at that time. Furthermore, according to the present invention, when a remaining idle resource amount is small, it is possible to reduce the resource amount allocated to a service and to run more services at the same time. And if there is a surplus capacity for resources state, it is possible to provide extra resources in a redundant amount in advance. This reason is to adjust range of demand for resource request party and a resource allocation policy, which is something which indicates the way to allocate an amount of resources based on a capacity or a usage of the managing resources, for a resource providing party.

BRIEF DESCRIPTIONS OF THE DRAWINGS

FIG. 4 is a drawing for specifically describing an advantageous effect of the first exemplary embodiment of the present invention.

FIG. 8 is a drawing for specifically describing an advantageous effect of the second exemplary embodiment of the present invention.

FIG. 14 is a drawing for specifically describing an advantageous effect of the fourth exemplary embodiment of the present invention.

FIG. 15 is a drawing for describing operations and advantageous effects of the present invention when the resource allocation systems of the present are embedded invention in various computer environments.

PREFERRED MODES OF THE INVENTION

Figure 1:
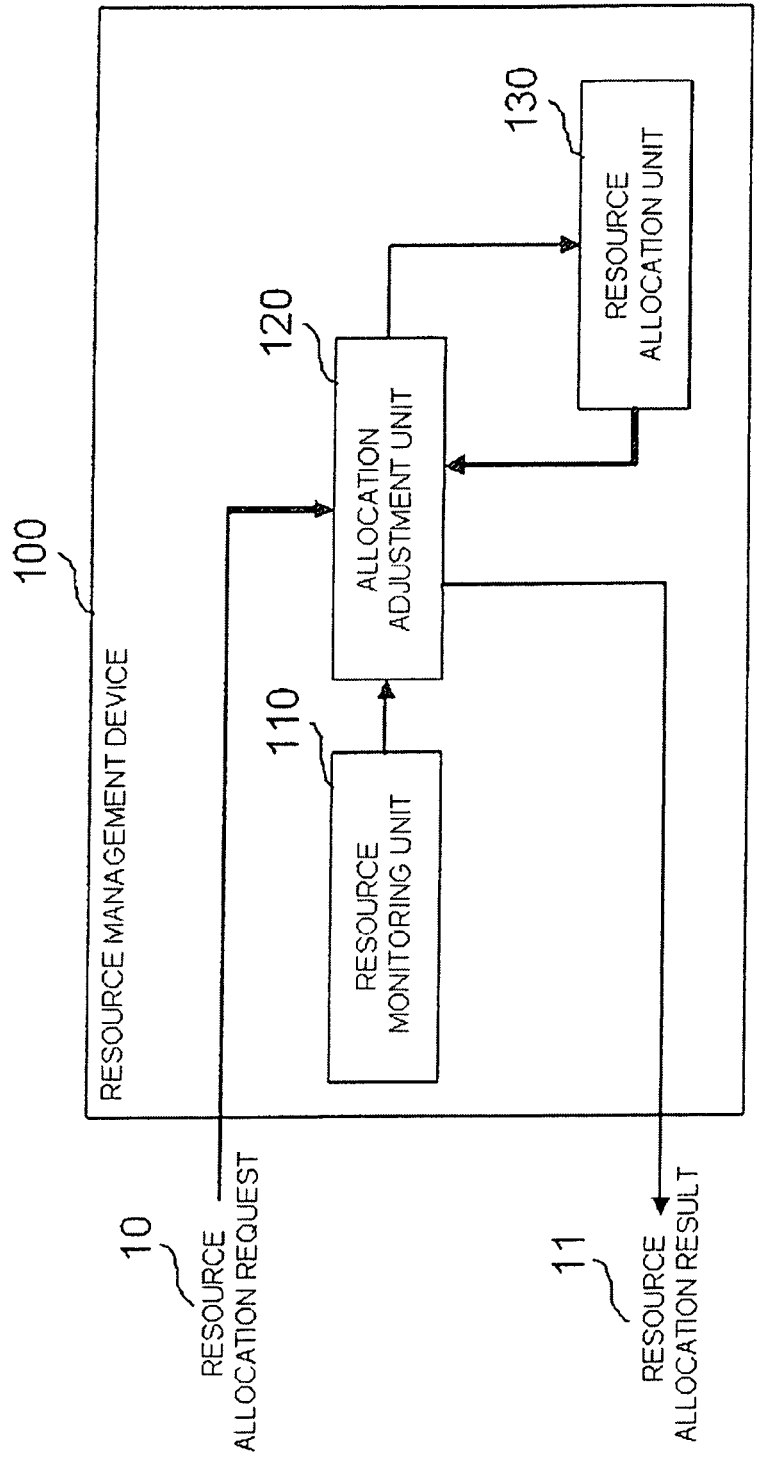
FIG. 1 is a block diagram showing a configuration of a resource allocation system (resource management device) of a first exemplary embodiment of the present invention.

First, the present disclosure describes preferred modes for realizing the invention in detail in reference to the figures.
First Exemplary Embodiment FIG. 1 is a block diagram showing a configuration of a resource allocation system (resource management device) of a first exemplary embodiment of the present invention. FIG. 1 shows a resource management device 100, which receives a resource allocation request 10 with types and amount of resources that are demanded, and returns a resource allocation result 11.

The resource management device 100 is configured to include a resource monitoring unit (resource state measuring unit) 110 which comprehends a current state of a managing resource(s), an allocation adjustment unit 120 which determines an allocating amount of a resource(s) complying a resource usages, by considering a demanded resource amount and the current state of the managing resources, and a resource allocation unit 130 which secures and allocates the allocation amount determined by the allocation adjustment unit 120 in response to the resource allocation request.

Here, the resource allocation request has a resource(s) that can be allocated to a program and service and a resource distribution indicating quality of the resource, that is, usage amount of real and virtualized hardware(s). For example, it can be described the number of machines, the number of CPUs, the number of devices, amount of CPU power, amount of memory, I/O capacity, I/O throughput, I/O bandwidth, cache capacity, type of device, object namespaces, and so on.

Usage of the hardware can be described as an absolute value representation and a relative value representation. For example, CPU power can be described as a expression such as "100 GFLOPS" in the absolute value representation, while can be described as a expression such as "30% of 1 CPU" or "30% of the whole system" in the relative value representation.

Furthermore, the resource allocation request 10 may include descriptions of minimum value, recommended value, maximum value, and priority, regarding the usage amount of the abovementioned hardware, or minimum value, recommended value, maximum value, and priority value tailored to resource usage.

For example the resource allocation request 10 can be described as request with allowable range such as "CPU power is a minimum value of 100 MFLOPS, a recommended value of 200 MFLOPS, and a maximum value of 400 MFLOPS".

Furthermore, for another example, if an environment rank can be defined and classified ranks complying computer usages the resource allocation request 10 can be described as request with allowable range tailored to the computer ranks such as "when the environment rank is 1, the CPU power is a minimum value of 100 MFLOPS, a recommended value of 200 MFLOPS and a maximum value of 400 MFLOPS, and when the environment rank is 2, the CPU power is a minimum value of 200 MFLOPS, a recommended value of 300 MFLOPS and a maximum value of 400 MFLOPS, . . . ".

Moreover, for another example, the resource allocation request 10 can be described as request with allowable range for arbitrary type of demanded resource in an arbitrary computer ranks such as "the CPU power is a minimum value of 100 MFLOPS, a recommended value of 200 MFLOPS if the environment rank is 1 or a recommended value of 300 MFLOPS if the environment rank is 2, and a maximum value of 400 MFLOPS".

The resource monitoring unit 110 returns a capacity or a usage of the managing resource, or results in which these information are encoded, when a resource observation is requested by the allocation adjustment unit 120. Below, such information is referred to as "a managing resource state".

The capacity indicates a configuration of, a type of and absolute amount of managing resources. On the other hand, the usage state indicates quality and configuration of using resource for each managing resource. Conversely, it is possible to substitute an unused state which is quality and configuration of unused resources for the usage state. Furthermore, an encoded result is a value in which resources and computer environment are ranked and are classified based on a prescribed threshold, and are converted symbols according to rank.

The allocation adjustment unit 120 determines a resource allocation amount based on the managing resource state and the resource allocation request 10. Concretely, the allocation adjustment unit 120 obtains the current managing resource state from the resource monitoring unit 110 when the resource allocation request 10 has been received. Next, the allocation adjustment unit 120 determines the resource allocation amount by an adjustment algorithm, based on the obtained current managing resource state and the resource allocation request 10. The adjustment algorithm is a calculation method for determining the resource allocation amount from the managing resource state and the resource allocation request 10, and its concrete examples are described later.

The allocation adjustment unit 120 requests a resource allocation to the resource allocation unit 130, when the resource allocation amount is determined, and secures the resources. If the resource is secured, the allocation adjustment unit 120 returns a message which indicates resource allocation success and the amount or configuration information of the secured resource as the resource allocation result 11 to a source of the resource allocation request 10. If the resource allocation amount could not be determined, that is, if resource requirements in the resource allocation request 10 cannot be satisfied due to a resource shortage, securing of a resource for starting a service is difficult, so the allocation adjustment unit 120 returns something that the resource cannot be secured, that is, a message of resource allocation failure as the resource allocation result 11 to a source of the resource allocation request 10.

The resource allocation unit 130 secures a necessary amount from the managing resource based on the resource allocation amount determined by the allocation adjustment unit 120. Furthermore, the resource allocation unit 130 returns the amount or configuration information of the secured resource to the allocation adjustment unit 120.

Here, the following sentences describe an example of the adjustment algorithm described above. One example of the adjustment algorithm is a method which determines an allocatable resource amount based on a resource amount calculated from a capacity of the managing resource. On the basis of this method, for example, it is possible to be allocatable capacity equivalent to 80% of the whole managing resources, from the current computer state obtained from the resource monitoring unit 110.

At this time, describe the capacity of whole managing resources as C, and a used amount of the resource as A. The allocatable resource capacity is calculated by expression $(C \times 0.8 - A)$. The allocation adjustment unit 120 determines a maximum amount that can be secured within a range which satisfies the resource allocation request 10 and which is within calculated allocatable resource capacity. Namely, if $(C \times 0.8 - A)$ is less than the minimum value of the resource allocation request 10, the allocation adjustment unit 120 responds that securing of a resource is not possible; if $(C \times 0.8 - A)$ is greater than or equal to the minimum value and less than or equal to the maximum value of the resource allocation request 10, the allocation adjustment unit 120 secures a resource which amount is equivalent to $(C \times 0.8 - A)$; and if $(C \times 0.8 - A)$ is greater than the maximum value of the resource allocation request 10, the allocation adjustment unit 120 secures a resource which amount is this maximum value.

Furthermore, in cases of an algorithm in which amount of secured resources should be a recommended value, when the allocatable resource amount is greater than the maximum value of the resource allocation request 10, the recommended value can be used instead of the maximum value in above exposition.

Furthermore, as another example of the adjustment algorithm, a method, which determines an allocation amount based on a used amount of or a remaining amount of the resource, is provided.

The following content gives a concrete example of determining allocation amount based on used resource amount. In the concrete example, an allocatable resource amount defines a maximum of 400 MFLOPS if CPU usage is less than 50%, a maximum of 300 MFLOPS if CPU usage is greater than or equal to 50% and less than 70%, a maximum of 200 MFLOPS if CPU usage is greater than or equal to 70% and less than 80% and a maximum of 100 MFLOPS if CPU usage is greater than or equal to 80%. The allocation adjustment unit 120 determines a maximum amount that can be secured within a range which is satisfied the resource allocation request 10 and which is within the allocatable resource amount according to each environment state. In this example also, the adjustment algorithm may be determined by recommended value, not the maximum value when secured resources are possible to satisfy the resource allocation request 10.

The following content also gives a concrete example of determining the allocation amount based on the remaining resource amount. In the concrete example, an allocatable resource amount defines, 1024 MB if 2 GB or more of memory is free, 512 MB if less than 2 GB and at least 1 GB is free and 256 MB when less than 1 GB is free. The allocation adjustment unit 120 determines a maximum amount that can be secured within a range which is satisfied the resource allocation request 10 and which is within the allocatable resource amount according to each environment state. In this example also, the adjustment algorithm may be determined by recommended value, not the maximum value when secured resources are possible to satisfy the resource allocation request 10.

Furthermore, it is possible to combine a plurality of adjustment algorithms including the abovementioned adjustment algorithms. As a example of a combination, one adjustment algorithm uses the maximum of allocatable resource amount which calculated by another adjustment algorithm. As another example of a combination, allocation resource amount is selected the minimum amount among the maximum of allocatable resource amount which are calculated by a plurality of adjustment algorithms. As another example of a combination, alternate adjustment algorithm is used when one adjustment algorithm cannot determine allocation resource mount.

Furthermore, in the abovementioned adjustment algorithm, it is possible to represent a resource judgment condition and a formula for determining the resource amount as one rule, to check as a rule-base, and to determine the resource amount.

Figure 2:
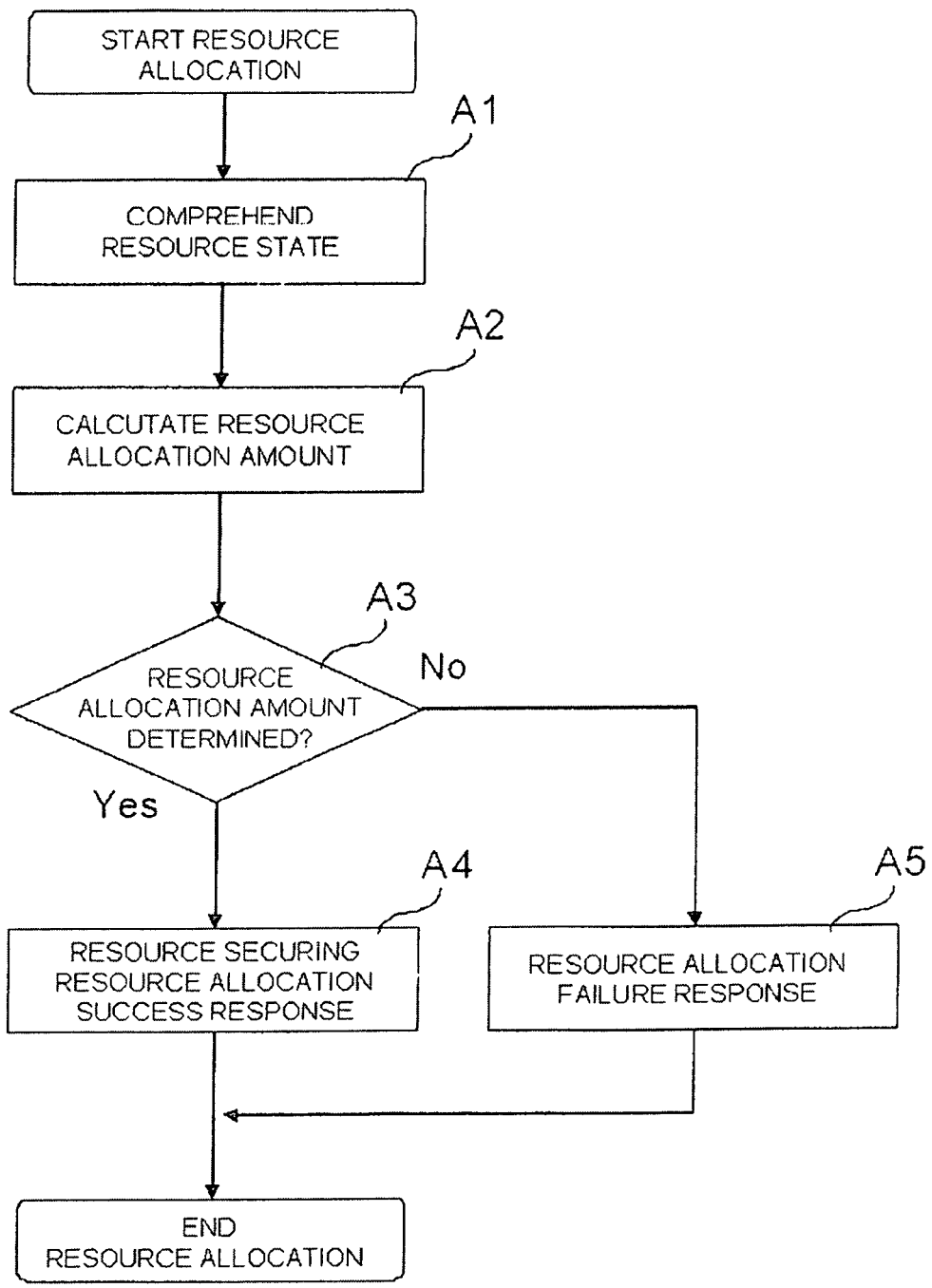
FIG. 2 is a flowchart illustrating operations of the resource allocation system (resource management device) of the first exemplary embodiment of the present invention.

Next, a following detailed description is given concerning operation of the resource allocation system (resource management device) of the present exemplary embodiment in reference to the figures. FIG. 2 is a flowchart illustrating the operation of the abovementioned resource allocation system (resource management device).

Referring to FIG. 2, first, when the allocation adjustment unit 120 receives the resource allocation request 10, an operation of-resource allocation starts ("start resource allocation" in FIG. 2).

The allocation adjustment unit 120 obtains the current managing resource state via the resource monitoring unit 110 (step A1).

The allocation adjustment unit 120 calculates the resource allocation amount satisfying the resource allocation request 10 based on the adjustment algorithm complying the current managing resource state (step A2).

The allocation adjustment unit 120 secures a resource via the resource allocation unit 130 when the resource allocation amount is calculated. And then the allocation adjustment unit 120 responds a resource allocation success response and notification of the allocated resource as a resource allocation result 11 to a source of the resource allocation request 10 (Yes in step A3, step A4).

On the other hand, in cases in which there is no resource allocation amount satisfying the resource allocation result 10, or in which the computed resource allocation amount could not be secured, the allocation adjustment unit 120 responds a resource allocation failure as the resource allocation result 11 to a source of the resource allocation request 10 (No in step A3, step A5)

As described above, in the present exemplary embodiment, it is possible to determine an allocation amount suitable for the resource usages by the allocation adjustment unit 120 obtaining the managing resource state via the resource monitoring unit 110, calculating the maximum of allocatable resource amount from the managing resource state, and adjusting with the resource allocation request 10.

In this way, it is possible to dynamically change limits of the allocation resource amount. Therefore, service availability is improved.

Figure 3:
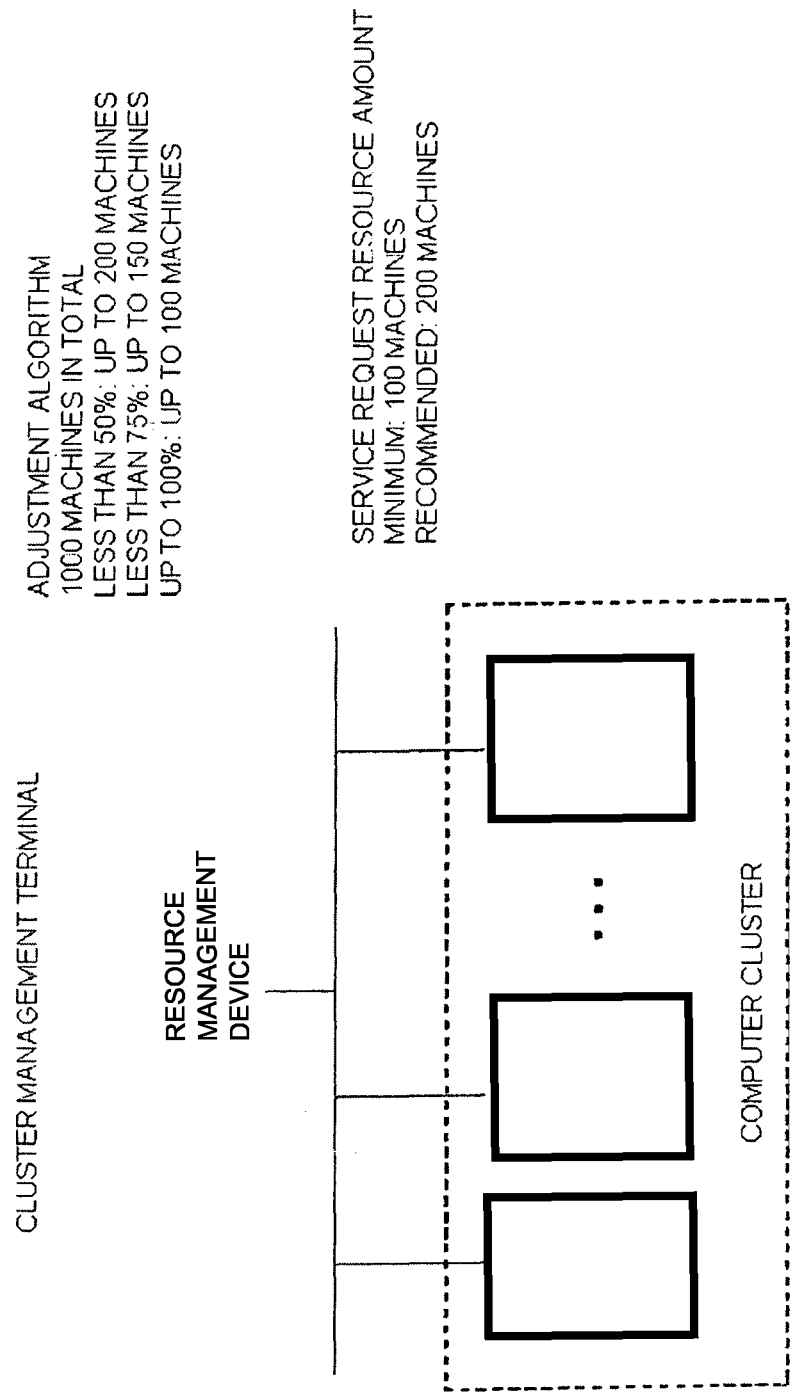
FIG. 3 is a drawing specifically describing an advantageous effect of the first exemplary embodiment of the present invention.

The following sentences illustrate a specific example in order to show an advantageous effect of the present exemplary embodiment as described above. As shown in FIG. 3, in a cluster management system, a cluster management terminal with a function equivalent to the resource management device of the abovementioned exemplary embodiment manages a computer cluster composed of 1000 computers (servers).

Here, a service is introduced and started at arbitrary timing. It is assumed that the service requires a recommended environment of 200 computers, and if at least 100 computers can be secured, the service can be started.

And the adjustment algorithm of the allocation adjustment unit 120 in the resource management device 100 is implemented a calculating method which is possible to allocate up to 200 computers if the number of used computers is less than 50%, up to 150 computers if the number of used computers is greater than or equal to 50% and less than 75% and up to 100 computers if the number of used computers is greater than or equal to 75%.

Firstly, a first service is requested of the cluster management terminal. At this time, in order to start the service, a resource allocation request 10 is requested to the resource management device 100. The allocation adjustment unit 120 of the resource management device 100 receives the resource allocation request 10, and starts resource allocation.

The allocation adjustment unit 120 requests the resource state of the managing resource to the resource monitoring unit 110.

The resource monitoring unit 110 observes the managing resource, that is, the state of servers within the computer cluster. The resource monitoring unit 110 estimates that 0 computers are allocated in the 1000 computer configuration since a service has not been started, and notifies the result to the allocation adjustment unit 120.

The allocation adjustment unit 120 judges that up to 200 computers can be allocated based on the adjustment algorithm since the state is such that 0 computers are being used among the 1000 computers, that is, used computer resources are less than 50%. And then it determines to allocate 200 computers, in line with the resource allocation request 10. Since the recommended environment is 200 computers.

The allocation adjustment unit 120 notifies the resource allocation unit 130 of allocating amount which is 200 computers.

The resource allocation unit 130 secures 200 computers from among unused resources, and responds indicating a resource securing success to the allocation adjustment unit 120.

The allocation adjustment unit 120 returns a secured resource to a service starting program, as a result of resource securing success.

The allocated resources are provided to another function of the cluster management system within the cluster management terminal, an environment necessary for the service is constructed on their resources and then the service is started.

In a similar way, when second and third services are introduced, since resource usage does not exceed 50%, 200 computers are allocated to each service.

In introducing a fourth service, since the state is such that 600 computers are being used among the 1000 computers, that is, 60% are being used. The allocation adjustment unit 120 judges that up to 150 computers can be allocated based on the adjustment algorithm. And then it determines to allocate 150 computers since the allocatable amount in the adjustment algorithm is within demanded range which is from 100 computers, that is minimum amount in the resource allocation request 10, to 200 computers, that is recommended amount in the resource allocation request 10.

Then in a similar way to the previous services, notification of resource securing and a secured resource is obtained, and the service is started with 150 computers.

When a fifth and a sixth service are introduced, 100 computers are allocated to their services since computer usage rate exceeds 75%.

When a seventh service is introduced, the service demand cannot be satisfied since only 50 computers remain. Therefore the allocation adjustment unit 120 returns a resource securing failure, and the service introduction fails.

FIG. 4 shows an allocation result (comparative example) by a method which does not change a resource amount complying the managing resource state, and an allocation result by the first exemplary embodiment of the present invention. In the comparative example, only 5 services are started. In addition, even if a method of Patent Document 2 is applied, in cases in which a resource is utilized, it is not possible to adjust resources since this is handled as a budget commit. Furthermore, even if resources can be adjusted by resource adjustment functions, various processings are necessary for changing the service allocation amount. On the other hand, in the present invention, it is possible to immediately introduce the sixth service since resource allocation amount is reduced when idle resource are not enough and are uneasy.

As mentioned above, it is possible to change the service allocation amount complying the managing resource state, and to start the service in the first exemplary embodiment of the present invention. And it is possible to support a larger number of services by changing the number of computers allocated based on the adjustment algorithm shown in FIG. 3, that is, by the usage rate of the number of computers in the cluster.

Above sentences show an example of the application of a cluster management system that controls the number of computers. In the same way, the present invention is possible to apply configuration control of the virtual machine by implementing it with a virtual machine management tool that is an application which manages a virtual machine, and a virtual machine monitor (VMM) that realizes the virtual machine.

Furthermore, the present invention is also possible to control the allocation amount of specific type of resources complying the usage of their resources by implementing a device managed their resources as well as real or virtual machine.

Second Exemplary Embodiment

Figure 5:
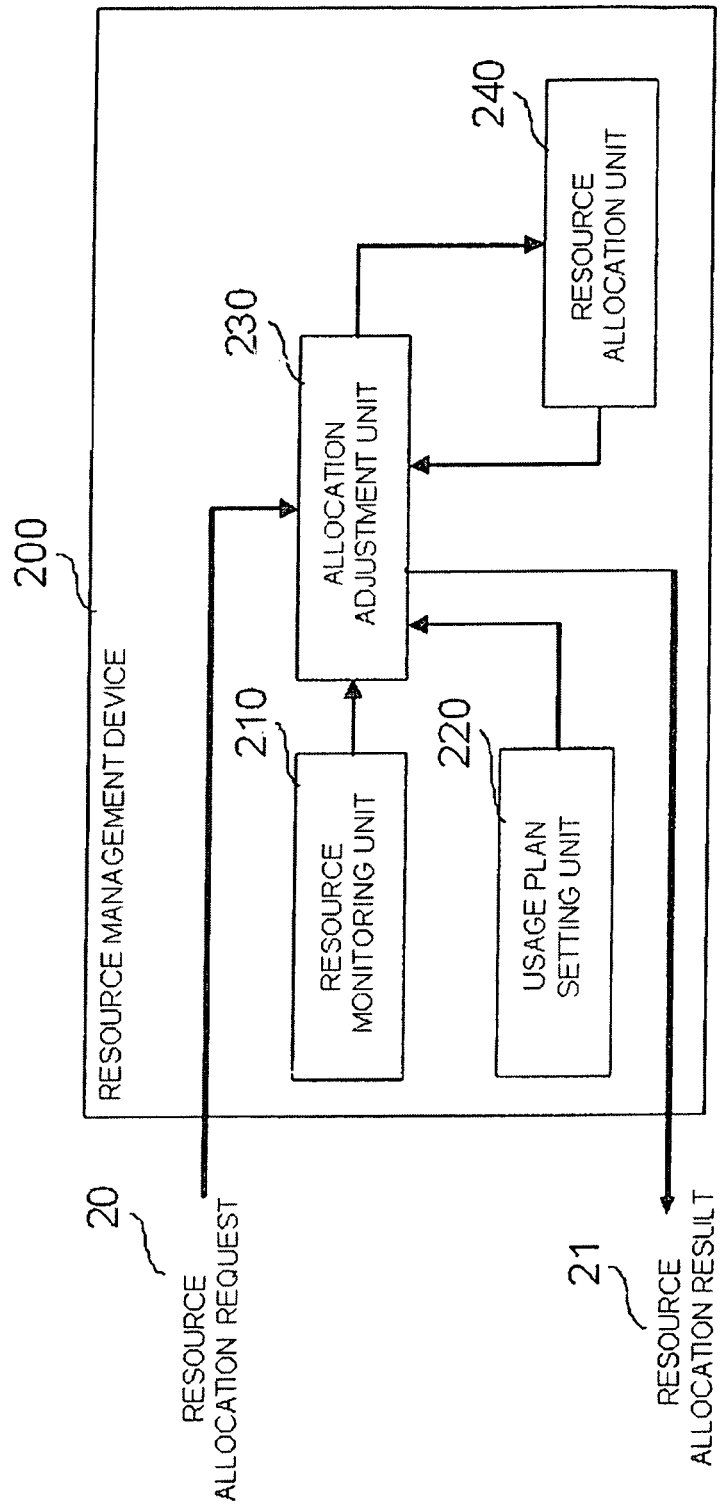
FIG. 5 is a block diagram showing a configuration of a resource allocation system (resource management device) of a second exemplary embodiment of the present invention.

Next, the following sentences describes a second exemplary embodiment of the present invention in detail in reference to the figures. FIG. 5 is a block diagram showing a configuration of a resource allocation system (resource management device) of a second exemplary embodiment of the present invention.

FIG. 5 shows a resource management device 200, which receives a resource allocation request 20 with type and amount of resources that are demanded, and returns a resource allocation result 21.

The resource management device 200 is configured to include a resource monitoring unit 210 which comprehends a current state of managing resource(s), a usage plan setting unit 220 which holds usage plan information for resource(s), an allocation adjustment unit 230 which determines an allocating amount of resources complying a resource usages by considering a demanded resource amount and the current state of the managing resource(s) and usage plan information for resource(s) which is forecasted or set in advance, and a resource allocation unit 240 which secures and allocates the allocation amount of resources determined by the allocation adjustment unit 230 in response to the resource allocation request. That is, compared to the configurations of the first exemplary embodiment described above, the usage plan setting unit 220 has been added to the configuration.

A setting resource amount that can be described in the resource allocation request 20 is equivalent to the resource allocation request 10.

The resource monitoring unit 210, returns the managing resource state when resource observation is requested by the allocation adjustment unit 230.

The usage plan setting unit 220 holds a usage plan (below, referred to as "usage plan information") of a resources that is set or predicted in advance. And it returns the usage plan information when information delivery is requested by the allocation adjustment unit 230. Examples of a usage plan information are a predicted number of services to be started (upper limit for the number of services which requests the resource allocation), predicted usage or maximum allocatable amount of resources for each service and so on.

The usage plan information is set previously by a resource manager (operator). A set value may be changed during operation and maintenance.

The allocation adjustment unit 230 determines the resource allocation amount based on the resource allocation request 20 and the managing resource state and/or usage plan information.

Concretely, the allocation adjustment unit 230 obtains the current resource state from the resource monitoring unit 210 and the usage plan information from the usage plan setting unit 220 when the resource allocation request 20 has been received.

Next, the allocation adjustment unit 230 determines the resource allocation amount by the adjustment algorithm, based on the obtained current managing resource state, the usage plan information, and the resource allocation request 20. The adjustment algorithm is a calculation method for determining the resource allocation amount from the managing resource state, the usage plan information, and the resource allocation request 20, and its concrete examples are described later.

The allocation adjustment unit 230 requests a resource allocation to the resource allocation unit 240, when the resource allocation amount is determined, secures the resources, and returns a message which indicates resource allocation success and the amount or configuration information of the secured resource as the resource allocation result 21. If resource allocation amount could not be determined, that is, if resource requirements in the resource allocation request 20 cannot be satisfied due to a resource shortage and so on, securing of resources for starting a service is difficult, so the allocation adjustment unit 230 returns something that the resource cannot be secured, that is, a message of resource allocation failure as a resource allocation response 21.

The resource allocation unit 240 secures a necessary amount from the managing resource based on the resource allocation amount determined by the allocation adjustment unit 230. Furthermore, the resource allocation unit 240 returns the amount or configuration information of the secured resource to the allocation adjustment unit 230 as.

Here, the following sentences describe an example of the adjustment algorithm using the second exemplary embodiment of the present invention. One example of the adjustment algorithm is a method which sets the resource amount that can be allocated as the usage plan information in advance. In this method, in response to the resource allocation request 20, the resource amount to be secured is determined under the conditions that will satisfy in a sequence (step by step) from a recommended value or a maximum value, in a range that does not exceed the setting allocatable maximum resource amount.

As another example of the adjustment algorithm using the second exemplary embodiment of the present invention, a method which sets predicted number of services to be started as the usage plan information. In this method, an allocatable maximum resource amount can be calculated by dividing equally an idle resources by remaining predicted number of services. Here, a remaining predicted number of services is calculated by subtracting the number of running services from a predicted number of services to be started (the usage plan information.). And, the resource amount to be secured is determined under conditions that will satisfy in a sequence from a recommended value or a maximum value, in a range that does not exceed the allocatable maximum resource amount.

As another example of the adjustment algorithm using the second exemplary embodiment of the present invention, a method uses a predicted resource usage with respect to each service is used in addition to the predicted number of services to be started, as the usage plan information. In contrast to the method using only the predicted number of services to be started, this method is possible to allocate preferentially resources into a specific service or a specific type of service by dividing an idle resources based on proportion of the predicted resource usages of each service since a predicted resource usages of each service is set.

Furthermore, it is possible to combine a plural adjustment algorithms including the abovementioned adjustment algorithms or the adjustment algorithms of the first exemplary embodiment.

Figure 6:
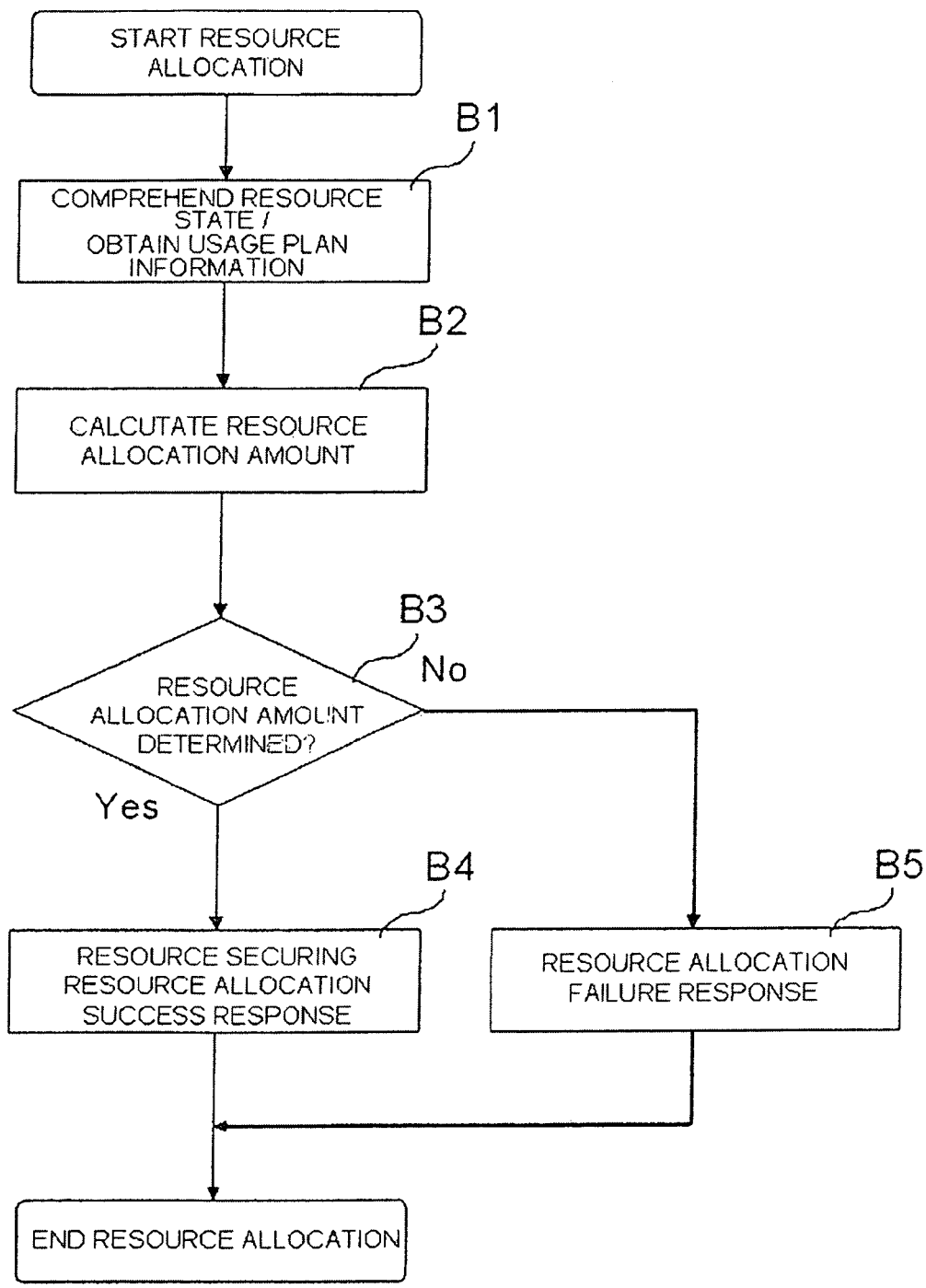
FIG. 6 is a flowchart illustrating operations of the resource allocation system (resource management device) of the second exemplary embodiment of the present invention.

Next, a following detailed description is given concerning operation of the resource allocation system (resource management device) of the present exemplary embodiment in reference to figures. FIG. 6 is a flowchart illustrating the operation of the abovementioned resource allocation system (resource management device).

Referring to FIG. 6, first, when the allocation adjustment unit 230 receives the resource allocation request 20, an operation of resource allocation starts ("start resource allocation" in FIG. 6).

The allocation adjustment unit 230 obtains a current managing resource state via the resource monitoring unit 210, and a usage plan information via the usage plan setting unit 220 (step B1).

The allocation adjustment unit 230 calculates the resource allocation amount satisfying the resource allocation request 20 based on the adjustment algorithm complying the current managing resource state, and the usage plan information (step B2).

The allocation adjustment unit 230 secures a resource via the resource allocation unit 240 when the resource allocation amount is determined. And then the allocation adjustment unit 230 responds a resource allocation success response and notification of the allocated resource as the resource allocation result 21 to a source of the resource allocation request 20 (Yes in step B3, step B4).

On the other hand, in cases in which there is no resource allocation amount satisfying the resource allocation request 20, or in which the calculated resource allocation amount could not be secured, the allocation adjustment unit 230 responds a resource allocation failure as the resource allocation result 21 to a source of the resource allocation request 20 (No in step B3, step B5).

As described above, in the present exemplary embodiment, it is possible to determine an allocation amount complying the resource usages and the setting resource usage plan by the allocation adjustment unit 230 obtaining the managing, resource state and the usage plan information, calculating the maximum of allocatable resource amount based on these and adjusting with the resource allocation request 20.

In this way, it is possible to further improve service operability and availability compared to the abovementioned first exemplary embodiment.

Figure 7:
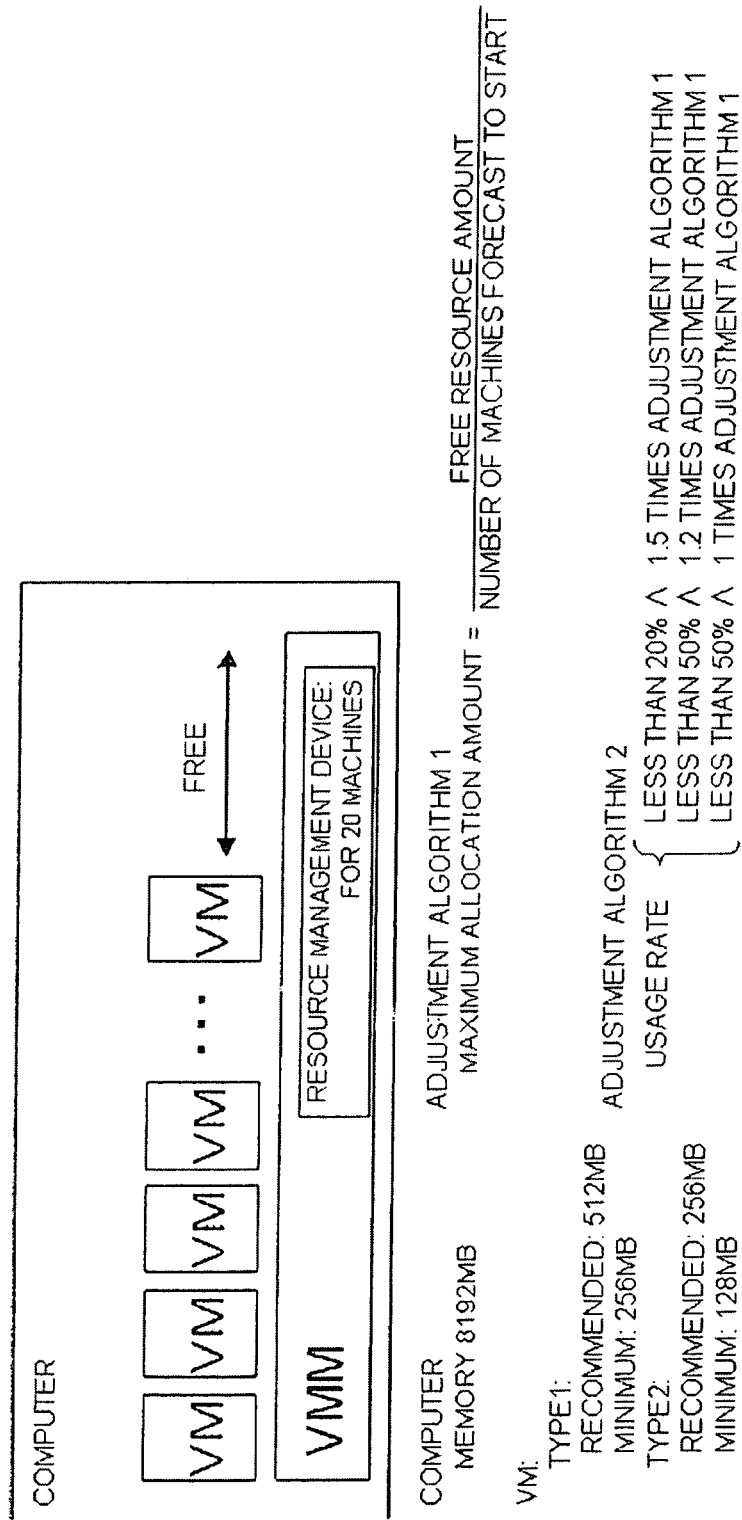
FIG. 7 is a drawing for specifically describing an advantageous effect of the second exemplary embodiment of the present invention.

The following sentences illustrate a specific example in order to show an advantageous effect of the present exemplary embodiment as described above. As shown in FIG. 7, the resource management device of the present exemplary embodiment is implemented inside a virtual machine monitor (referred to as VMM below) realizing a virtual machine (referred to as VM below).

Here, only securing memory of VM in FIG. 7 is considered. In the machine shown FIG. 7, a usable memory area for the VM is 8192 MB.

A computer manager sets 20 machines in the usage plan setting unit 220 as a forecast number of VMs to be run.

Introduced VMs have two types. Type 1 of VM requests memory of a recommended 512 MB and a minimum 256 MB. Type 2 of VM requests memory of a recommended 256 MB and a minimum 128 MB.

Furthermore, here, Type 1 and Type 2 of VMs are alternately introduced.

First, an example of the case of Patent Document 2 is described as a comparative example. If technology of Patent Document 2 is applied, the maximum allocatable resource amount is limited to 409.6 MB (=8096 MB÷20 machines) since a policy is taken of 20 equal partitions of the managing resource.

Therefore, when the Type 1 VM requests a resource, the recommended amount exceeds the maximum allocatable resource amount, and then memory of 409.6 MB is allocated.

When the Type 2 VM requests a resource, the recommended amount does not exceed the maximum allocatable resource amount, and then memory of 256 MB is allocated.

As a result, memory is allocated as a comparative example field of FIG. 8, and 1536 MB is free.

Next, an example is described of cases in which the present exemplary embodiment is applied. The adjustment algorithm of the allocation adjustment unit 230 allocates memory in a range that does not exceed the equal portions of the number of VMs forecast for usage to be started hereafter based on free resource. This adjustment algorithm is referred to as adjustment algorithm 1.

First, when a first VM start (Type 1) is requested, a resource allocation for starting the VM is requested of the VMM. This means requesting the resource allocation request 20 which is to secure a memory of recommended 512 MB and a minimum of 256 MB to the allocation adjustment unit 230 of the resource management device 200.

The allocation adjustment unit 230 requests a report of the managing resource state of the resource monitoring unit 210. The resource monitoring unit 210 observes the current managing resource state. The resource monitoring unit 210 measures that there is 8192 MB overall and 0 MB in use, and that an allocation has been made to 0 VMs, and notifies a result to the allocation adjustment unit 230 since the VM is not running at first.

Furthermore, the allocation adjustment unit 230 requests a setting value of the usage plan setting unit 220, and obtains a response that a predicted number of VMs to start is 20.

The allocation adjustment unit 230 calculates that an allocatable maximum amount is 409.6 MB (=8096 MB÷20 VM) based on the adjustment algorithm 1 since free memory is 8192 MB and the predicted number of VM to start hereafter is 20, which their information is given in the obtained managing resource state and the usage plan information. And then it determines to allocate the allocatable maximum amount 409.6 MB so as to satisfy the resource allocation request 20 into VM by comparing the resource allocation request 20 and the allocatable maximum amount.

The allocation adjustment unit 230 notifies the resource allocation unit 240 that 409.6 MB is being allocated to VM. And then, the resource allocation unit 240 secures 409.6 MB from the unused resource, and responds its results to the allocation adjustment unit 230.

The allocation adjustment unit 230 returns the resource secured in above way as a resource allocation success result to a VM starting program. By this way, the VM is possible to start and then the VM runs.

Next, when a second VM start (Type 2) is requested, resource allocation for starting the VM is requested of the VMM. This means requesting the resource allocation request 20 which is to secure a memory of a recommended 256 MB and a minimum of 128 MB to the allocation adjustment unit 230 of the resource management device 200.

The allocation adjustment unit 230 requests a report of the managing resource state of the resource monitoring unit 210. The resource monitoring unit 210 observes the current managing resource state. The resource monitoring unit 210 measures that there is 8192 MB overall, 409.6 MB used and allocated to 1 VM, and notifies a result to the allocation adjustment unit 230.

Furthermore, the allocation adjustment unit 230 requests a setting value of the usage plan setting unit 220, and obtains a response that the predicted number of VMs to start is 20.

The allocation adjustment unit 230 calculates that an allocatable maximum amount is 409.6 MB (=7782.4 MB÷19 VM) based on the adjustment algorithm 1 since free memory is 7782.4 MB (=8192 MB−409.6 MB) and the predicted number of VM to start hereafter is 19 (=20 VM−1 VM), which their information is given in the obtained managing resource state and the usage plan information. And then it determines to allocate memory of 256 MB which is recommended amount so as to satisfy the resource allocation request 20 into VM by comparing the resource allocation request 20 and the allocatable maximum amount.

The allocation adjustment unit 230 notifies the resource allocation unit 240 that 256 MB is being allocated to VM. And then, the resource allocation unit 240 secures 256 MB from the unused resource, and responds its results to the allocation adjustment unit 230.

The allocation adjustment unit 230 returns the resource secured in above way as a resource allocation success result to a VM starting program. By this way, the VM is possible to start and a second VM runs.

Next, when a third VM start (Type 1) is requested, resource allocation for starting the VM is requested of the VMM. This is means requesting the resource allocation request 20 which is to secure a memory of recommended 512 MB and a minimum of 256 MB to the allocation adjustment unit 230 of the resource management device 200.

The allocation adjustment unit 230 requests a report of the managing resource state of the resource monitoring unit 210. The resource monitoring unit 210 observes the current managing resource state. The resource monitoring, unit 210 measures that there is 8192 MB overall, 665.6 MB used and allocated to 2 VMs, and notifies a result to the allocation adjustment unit 230.

Furthermore, the allocation adjustment unit 230 requests a setting value of the usage plan setting unit 220, and obtains a response that the predicted number of VMs to start is 20.

The allocation adjustment unit 230 calculates that an allocatable maximum amount is 418.1 MB (=7526.4 MB÷18 VMm round to the second decimal place) based on the adjustment algorithm 1 since free memory is 7526.4 MB(=8192 MB−665.6 MB) and the predicted number of VM to start hereafter is 18(=20 VM−2 VM), which their information is given in the obtained managing resource state and the usage plan information. And then it determines to allocate the recommended memory which is 256 MB so as to satisfy the resource allocation request 20 into VM by comparing the resource allocation request 20 and the allocatable maximum amount. And then it determines to allocate the allocatable maximum amount 418.1 MB so as to satisfy the resource allocation request 20 into VM by comparing the resource allocation request 20 and the allocatable maximum amount.

The allocation adjustment unit 230 notifies the resource allocation unit 240 that 418.1 MB is being allocated to VM. And then, the resource allocation unit 240 secures 409.6 MB from the unused resource, and responds its results to the allocation adjustment unit 230.

The allocation adjustment unit 230 returns the secured resource as a resource allocation success result to a VM starting program. By this way, the VM is possible to start and then third VM runs.

In this way, it is possible to immediately reflect a portion of the resource amount that is not used in the second VM and that is free, in allocation of remaining VMs.

This type of procedure is sequentially repeated and then memory is allocated as in the first mode field of the present invention (first mode of the second exemplary embodiment) in FIG. 8 as a result.

The third and subsequent Type 1 VMs is reflected a resource amount of a portion that has not been used in allocation of a Type 2 VM managed before, and are allocated memory more than the equal amount of the held managing resource. As a result thereof, in the present exemplary embodiment, the recommended memory amount is satisfied in the 15th and later VMs.

Furthermore, in the present exemplary embodiment, the overall free resource amount is 964.1 MB, and can be utilized effectively in comparison to the 1536 MB of the existing technology.

In this way, it is possible to effectively allocate the resource by using the usage plan information, because system can refer not only the managing resource state at a point in time which a request is ordered, but also running, predications and assumed environment settings.

Next, the following sentences describe another specific example using an adjustment algorithm (adjustment algorithm 2) other than the abovementioned adjustment algorithm 1.

The adjustment algorithm 2 is based on the adjustment algorithm 1 but is a method of changing the allocation resource amount as described below, according to the proportion of the free resource amount.

When the used resource amount is less than 20%, the resource is sufficient, and it is possible to allocate 1.5 times that of the adjustment algorithm 1;

When the used resource amount is less than 50%, the resource still has surplus, and it is possible to allocate 1.2 times that of the adjustment algorithm 1;

When the used resource amount is 50% or greater, only a little of the resource remains, and it is possible to allocate the same as that of the adjustment algorithm 1.

First, when a first VM start (Type 1) is requested, a resource allocation for the VM stall is requested of the VMM. This means requesting the resource allocation request 20 which is to secure a memory of recommended 512 MB and a minimum of 256 MB to the allocation adjustment unit 230 of the resource management device 200.

The allocation adjustment unit 230 requests a report of the managing resource state of the resource monitoring unit 210. The resource monitoring unit 210 observes the current managing resource state. The resource monitoring unit 210 measures that there are 8192 MB overall and 0 MB in use, and that an allocation has been made to 0 VMs, and notifies a result to the allocation adjustment unit 230 since the VM is not running at first.

Furthermore, the allocation adjustment unit 230 requests a setting value of the usage plan setting unit 220, and obtains a response that the number of VMs forecast to start is 20.

The allocation adjustment unit 230 calculates that an allocatable maximum amount is 614.4 MB (=8096 MB÷20 VM×1.5) based on the adjustment algorithm 1 since free memory is 8192 MB and the predicted number of VM to start hereafter is 20, which their information is given in the obtained managing resource state and the usage plan information. And then it determines to allocate memory of 512 MB which is recommended amount so as to satisfy the resource allocation request 20 into VM by comparing the resource allocation request 20 and the allocatable maximum amount.

The allocation adjustment unit 230 notifies the resource allocation unit 240 that 512 MB is being allocated to VM. And then, the resource allocation unit 240 secures 512 MB from the unused resource, and responds its results to the allocation adjustment unit 230.

The allocation adjustment unit 230 returns the secured resource as a resource allocation success result to the VM starting program. By this way, the VM is possible to start and then the VM runs.

A similar procedure is repeated for second and subsequent VM starts, and then as in the second mode field of the present invention (second mode of the second exemplary embodiment), in FIG. 8 as a result.

In FIG. 8, a scaling factor is a multiple with respect to the adjustment algorithm 1 for the adjustment algorithm 2, the allocation amount is the resource amount allocated to a VM and a free resource amount indicates a resource amount that is in a free state after the VM has been allocated.

Shown this second mode (second mode of the second exemplary embodiment) of the invention as in FIG. 8, resources can be more effectively utilized because the resource amount allocated to each VM is improved compared to the first mode (first mode of the second exemplary embodiment) of the invention as in FIG. 8, and the free resource amount is 613.3 MB, namely decreasing.

As described above, in the present exemplary embodiment, it is possible to appropriately respond also to cases in which the usage plan information is changed along the way since the allocation amount is adjusted based on the managing resource state, and the usage plan information with changing adjustment degree for each judgment.

For example, in abovementioned example, when the number of VMs predicted to start is changed with 25 after a state in which a resource is allocated to 10 VMs, it is possible to reflect the additional 5 machines after the point in time at which a setting is changed since the 11th VM distributes 4283.5 MB (3847.3 MB in the adjustment algorithm 2) for 15 VMs to start hereafter and then the maximum resource allocation amount is 285.6 MB (256.6 MB in the adjustment algorithm 2).

Third Exemplary Embodiment

Figure 9:
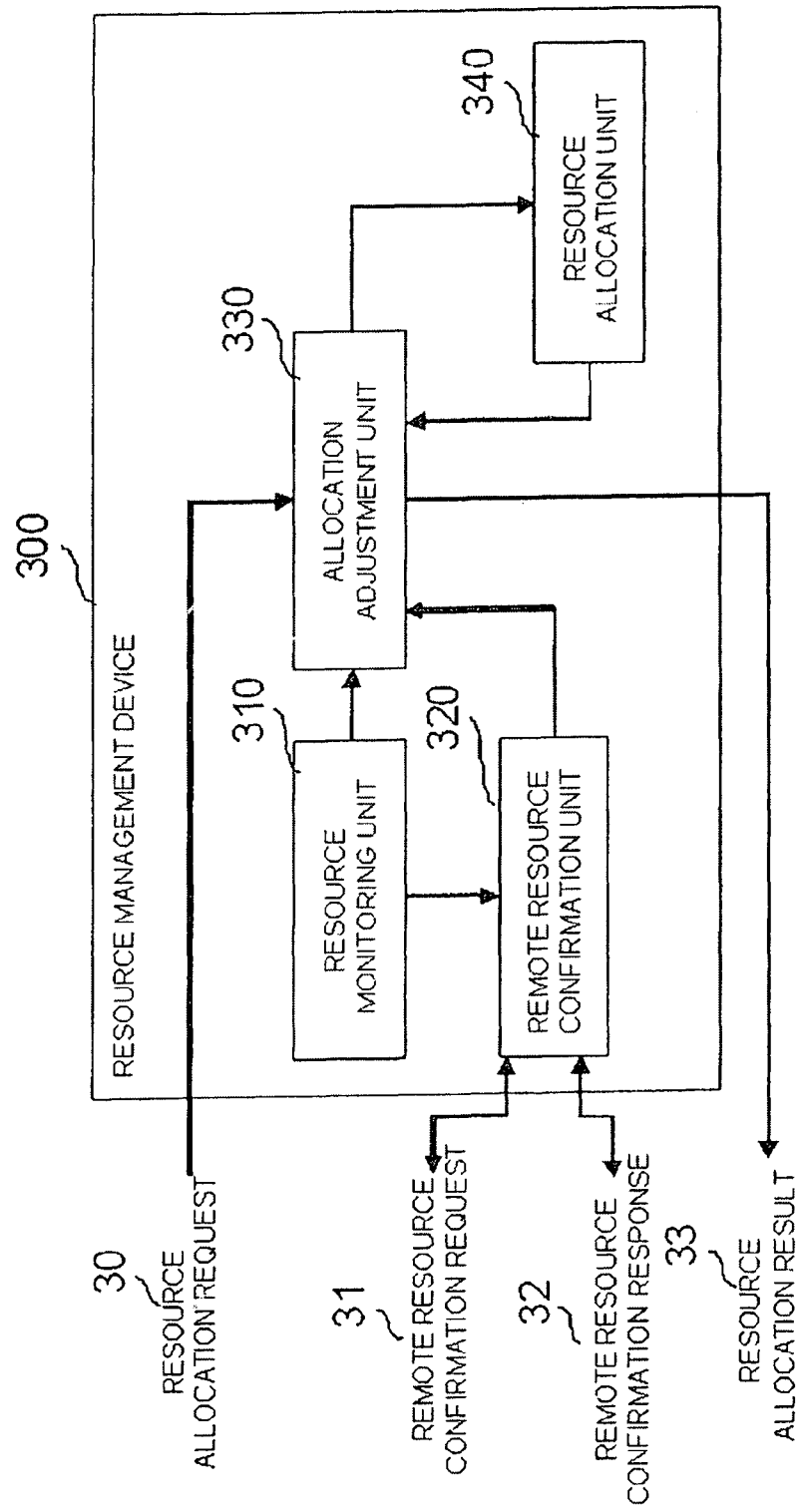
FIG. 9 is a block diagram showing a configuration of a resource allocation system (resource management device) of a third exemplary embodiment of the present invention.

Next, the following sentences describe a third exemplary embodiment of the present invention in detail in reference to the figures. FIG. 9 is a block diagram showing a configuration of a resource allocation system (resource management device) of the third exemplary embodiment of the present invention.

FIG. 9 shows a resource management device 300, which receives a resource allocation request 30 with type and amount of resources that is demanded, and returns a resource allocation result 33.

The resource management device 300 is configured to include a resource monitoring unit 310 which comprehends a current state of managing resources, a remote resource confirmation unit 320 which confirms a securing state of a remote resource, an allocation adjustment unit 330 which determines an allocating amount of resources complying a resource usages by considering a demanded resource amount and the current state of the managing resource, and from a confirmation state of the remote resource, and a resource allocation unit 340 which secures and allocates the allocation amount of resources determined by the allocation adjustment unit 330 in response to the resource allocation request. That is, compared to the configuration of the first exemplary embodiment described above, the remote resource confirmation unit 320 has beep added to the configuration.

The resource allocation request 30 can add a location of a remote resource and a request identifier, in addition to the resource allocation request 10 described in the abovementioned first exemplary embodiment.

The resource monitoring unit 310 returns the managing resource when resource observation is requested by the allocation adjustment unit 330 and the remote resource confirmation unit 320.

The remote resource confirmation unit 320 requests a confirmation of a securing state of the remote resources by sending a remote resource confirmation request 31 to a resource management device managing the remote resource when a remote resource confirmation is requested by the allocation adjustment unit 330. Here, the remote resource indicates a resource managed outside the resource management device 300, which has received the resource allocation request 30. In contrast to this, a resource managed inside the resource management device 300 is referred to as a managing resource. Furthermore, the resource management device that receives the remote resource confirmation request 31 is similar to the resource management device 300 of the present invention or is a device having, at least a function of returning a resource state of the remote resource. The remote resource confirmation unit 320 transfers remote resource confirmation results 32 returned from such remote resource management device to the allocation adjustment unit 330.

The remote resource confirmation unit 320 also gets the managing resource state via the resource monitoring unit 310 and returns resource information as remote resource confirmation results 32 when it receives the remote resource confirmation request 31 from a remote resource confirmation unit of another resource management device.

The allocation adjustment unit 330 determines a resource allocation amount based on the managing resource state, the resource allocation request 30, and the remote resource confirmation results 32.

Concretely, the allocation adjustment unit 330 extracts the remote resource information from the resource allocation request 30 and requests securing state confirmation of the remote resource via the remote resource confirmation unit 320 when the resource allocation request 30 has been received.

The allocation adjustment unit 330 obtains the current resource state from the resource monitoring unit 310 in cases in which the minimum necessary remote resource has been secured.

Next, the allocation adjustment unit 330 determines the managing resource allocation amount by an adjustment algorithm, based on the obtained current managing resource state, the remote resource state, and the resource allocation request 30. The adjustment algorithm is a calculation method for determining the resource allocation amount from the managing resource state, the remote resource state, and the resource allocation request 30, and is similar to the adjustment algorithm of the first exemplary embodiment of the present invention.

The allocation adjustment unit 330 requests a resource allocation to the resource allocation unit 340, when the managing resource allocation amount is determined, and secures the managing resource. If the resources are secured, the allocation adjustment unit 330 returns a message which indicates resource allocation success and the amount or configuration information of the secured resource as the resource allocation result 33 to a source of the resource allocation request 30. If the resource allocation amount could not be determined, that is, if resource requirements in the resource allocation request 30 cannot be satisfied due to a shortage of resources and so on, securing of resources for starting a service is difficult, so the allocation adjustment unit 120 returns something that a resource cannot be secured, that is, a message of resource allocation failure as the resource allocation result 33 to a source of the resource allocation request 30.

The resource allocation unit 340 secures a necessary amount from the managing resource based on the resource allocation amount determined by the allocation adjustment unit 330. Furthermore, the resource allocation unit 340 returns the amount or configuration information of the secured resource to the allocation adjustment unit 330.

Figure 10:
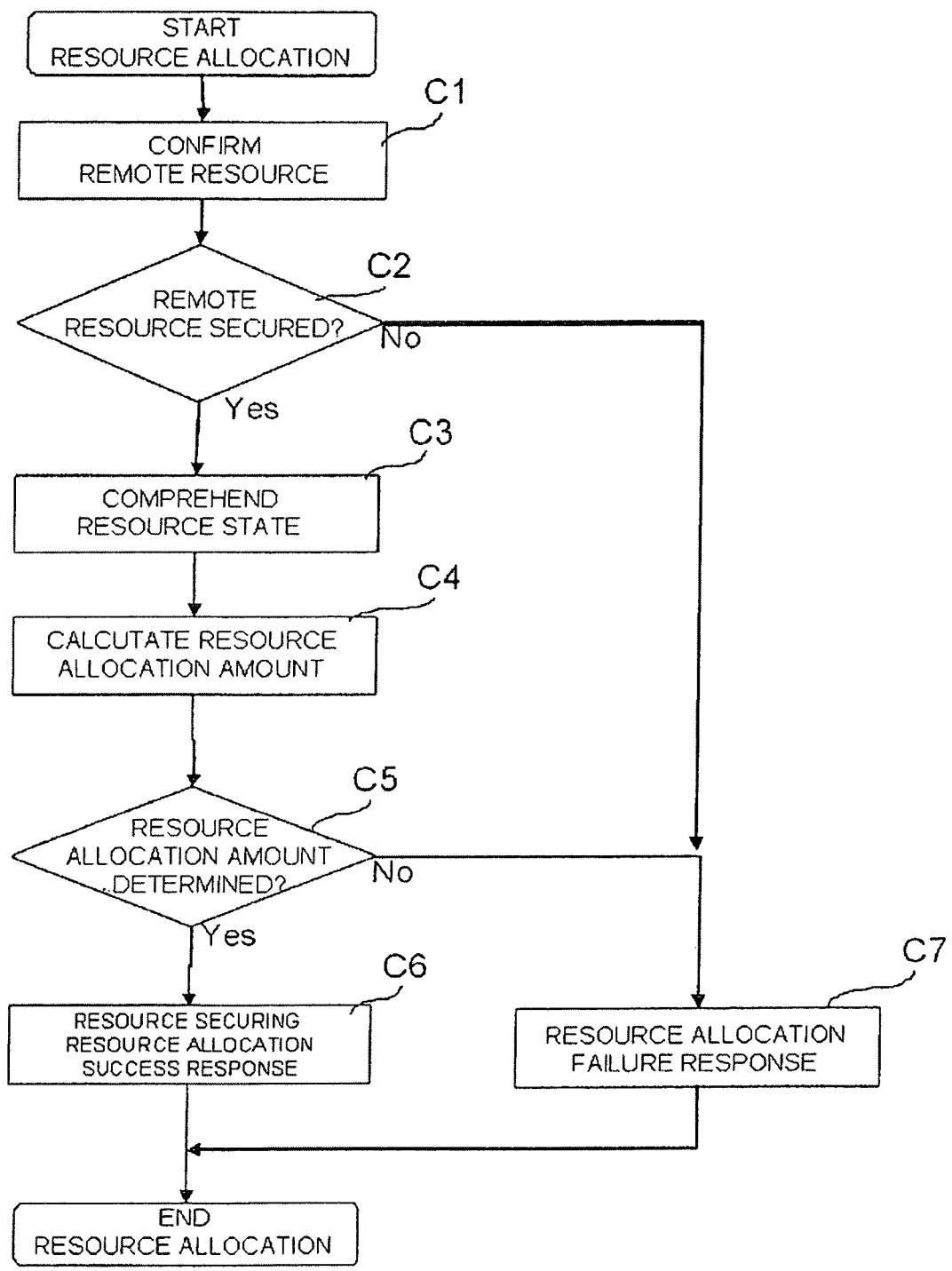
FIG. 10 is a flowchart illustrating operations of the resource allocation system (resource management device) of the third exemplary embodiment of the present invention.

Next, a following detailed description is given concerning operation of the resource allocation system (resource management device) of the present exemplary embodiment in reference to figures. FIG. 10 is a flowchart illustrating the operation of the abovementioned resource allocation system (resource management device).

Referring to FIG. 10, first, the allocation adjustment unit 330 receives the resource allocation request 30, an operation of resource allocation starts ("start resource allocation" in FIG. 10).

The allocation adjustment unit 330 requests the securing state of the remote resource to the resource management device of the remote resource via the remote resource confirmation unit 320, and comprehends the securing state of the remote resource (step C1).

The allocation adjustment unit 330 judges whether or not the minimum necessary amount of the remote resource has been secured (step C2).

In cases in which the securing of the minimum necessary amount of the remote resource has succeeded, the allocation adjustment unit 330 obtains the current managing resource state via the resource monitoring unit 310 (step C3).

The allocation adjustment unit 330 calculates the resource allocation amount satisfying, the resource allocation request 30 based on the adjustment algorithm complying the current managing resource state, and secured resource state of the remote resource (step C4).

The allocation adjustment unit 330 secures a resource via the resource allocation unit 340 when the allocation amount of the managing resource is determined. And then the allocation adjustment unit 330 responds a resource allocation success response and notification of the allocated resource as the resource allocation result 33 to a source of the resource allocation request 30 (Yes in step C5, step C6).

On the other hand, in cases in which there is no resource allocation amount satisfying the resource allocation request 30, or in which the calculated resource allocation amount could not be secured, the allocation adjustment unit 330 responds a resource allocation failure as the resource allocation result 33 (No in step C5, step C7). And, in cases in which there has been a failure to secure the minimum necessary remote resource (No in step C2), the allocation adjustment unit 330 also judges that that resource securing is not necessary, and responds a resource allocation failure (step C7).

As described above, in the present exemplary embodiment, it is possible to determine an allocation amount suitable for the resource usage state including the remote resource by the allocation adjustment unit 330 obtaining the managing resource state and the remote resource state, calculating the maximum of allocatable resource amount based on the managing resource state and the remote resource state, and adjusting with the resource allocation request 30.

Furthermore, it is possible to coordinate with peripheral resource management devices, and to judge whether or not allocation of a resource necessary for starting a service is possible overall by introducing the resource allocation request 30 since the present exemplary embodiment is such that it is possible to confirm securing of the remote resource, in comparison to the first exemplary embodiment of the present invention.

Figure 11:
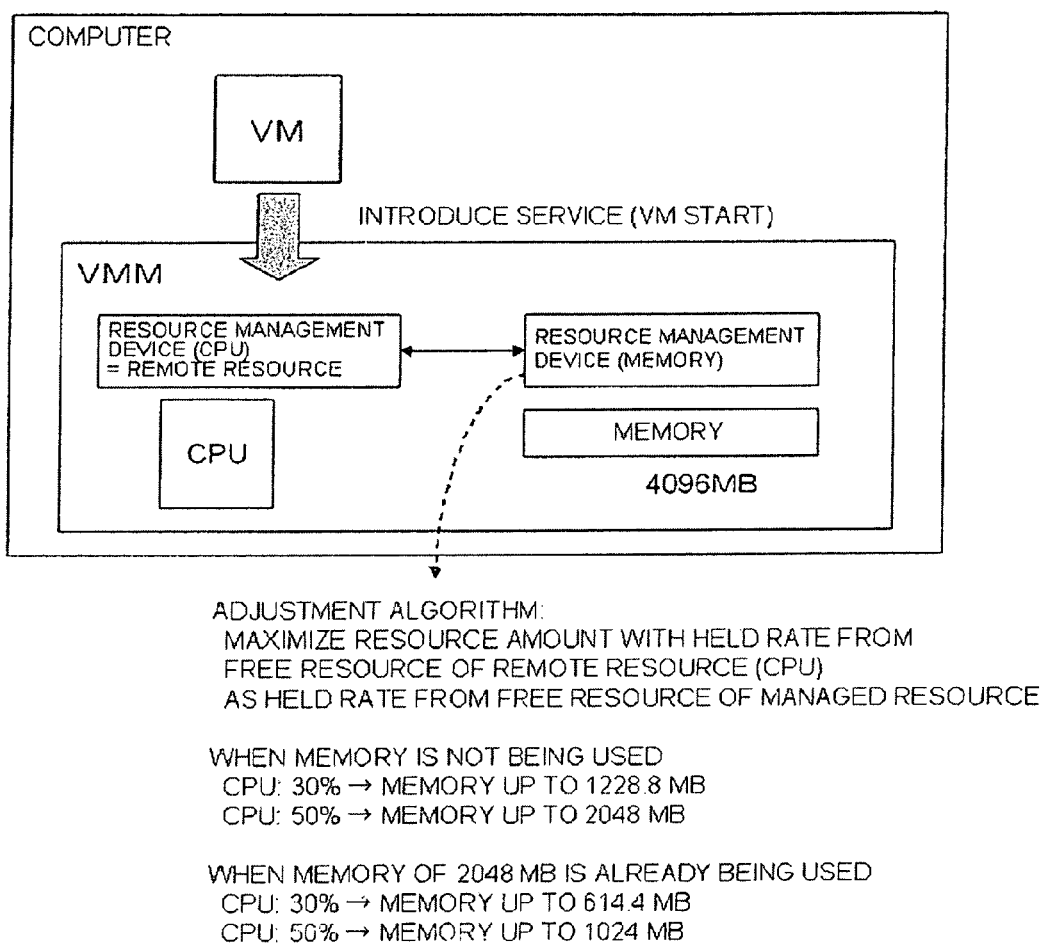
FIG. 11 is a drawing for specifically describing an advantageous effect of the third exemplary embodiment of the present invention.

The following sentences illustrate a specific example in order to show an advantageous effect of the abovementioned present exemplary embodiment. As shown in FIG. 11, a resource management device (memory) runs as a resource management of memory within the VMM. In addition, there is another resource management device (CPU) that manages a resource (CPU) outside of resources managed by the resource management device (memory).

The adjustment algorithm allocates a maximum amount of memory which is calculated by multiplying the free managing resource (memory) by rate of resource which is secured for the free remote resource (CPU). As the adjustment algorithm, an algorithm is used in which a holding rate (securing rate) from a free resource of the remote resource (CPU) is the holding rate (securing rate) from a free resource of the managing resource (memory), and the resource amount is maximized.

First, the allocation adjustment unit 330 of the resource management device (memory) receives a resource allocation request 30 for memory when the VM start request is arrived.

The allocation adjustment unit 330 obtains an allocation amount of the remote resource (CPU) via the remote resource confirmation unit 320 in order to confirm the securing state of a related remote resource.

In time, it is assumed to return a result that 30% of CPU power has been secured from the remote resource confirmation unit 320.

The allocation adjustment unit 330 calculates the maximum allocatable amount by using the adjustment algorithm. For example, in cases in which 4096 MB of memory is free, the maximum allocatable amount is 1228.8 MB (=4096 MB×30%); and in cases in which 2048 MB of memory is free, the maximum allocatable amount is 614.4 MB (=2048 MB×30%), Similarly, for example, when a result that 50% of CPU power has been secured is obtained, in cases in which 4096 MB of memory is free, the maximum allocatable amount is 2048 MB (=4096 MB×50%): and in cases in which 2048 MB of memory is free, the maximum allocatable amount is 1024 MB (=2048 MB×50%).

The allocation adjustment unit 330 determines a resource allocation amount that does not exceed the computed maximum allocatable amount complying the resource allocation request 30.

The allocation adjustment unit 330 secures a managing resource (memory) of a resource allocation amount determined via the resource allocation unit 340, and returns the resource allocation result 33, with the secured resource as a resource allocation success result to the VM starting program.

By applying this adjustment algorithm, when a free resource amount exists in the CPU power, it is possible to prevent failure of starting the VM due to insufficient memory.

In the abovementioned example, it is the cases in which the remote resource is in the same computer, but it is also possible to cases in which the remote resource is not in the same computer. For example, when a display device exists beyond a network, a frame memory according to screen size is necessary. By applying the present exemplary embodiment, it is possible to change allocation memory amount in accordance with the screen size.

As described above, in the present exemplary embodiment, it is possible to judge securing resources in consideration of the remote resources.

Fourth Exemplary Embodiment

Figure 12:
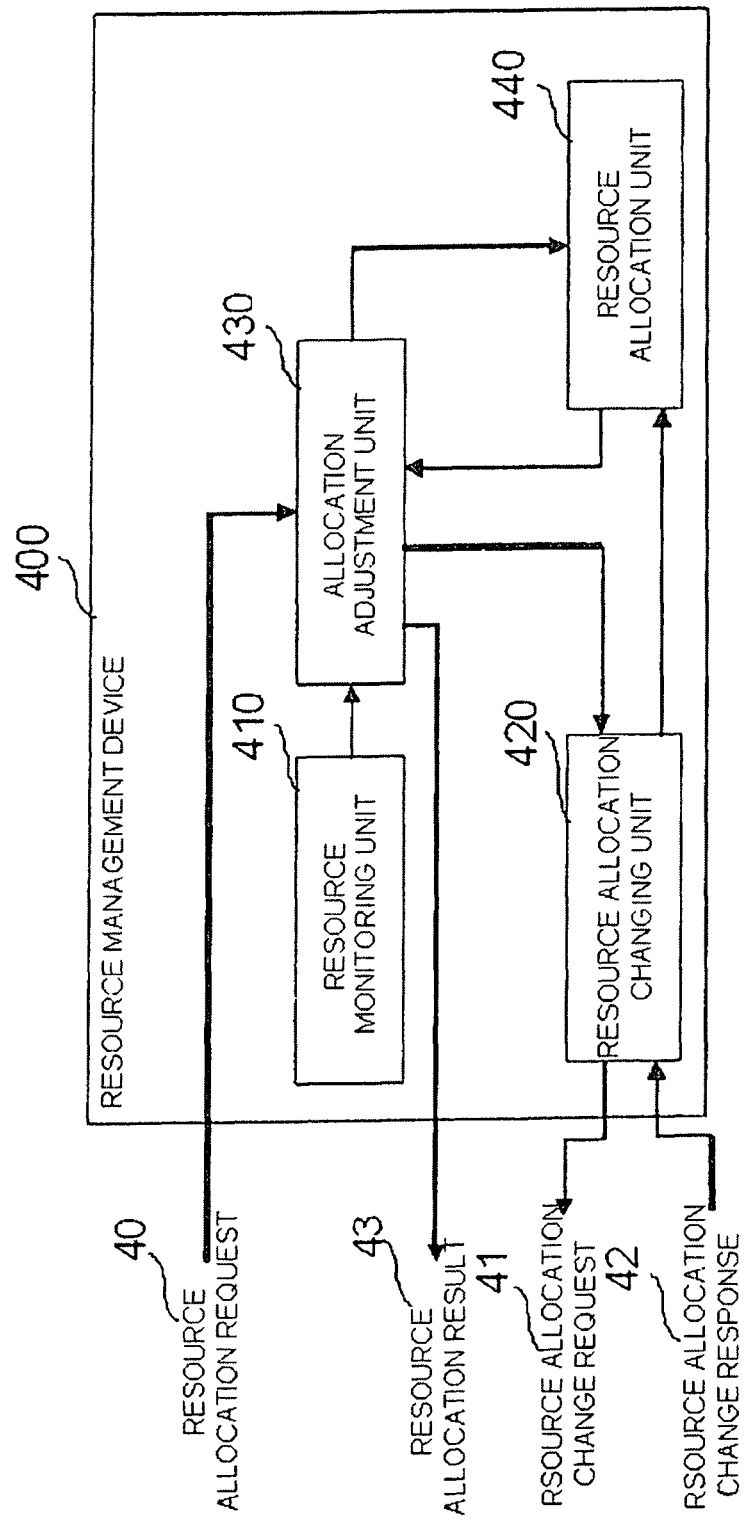
FIG. 12 is a block diagram showing a configuration of a resource allocation system (resource management device) of a fourth exemplary embodiment of the present invention.

Next, the following sentences describe a fourth exemplary embodiment of the present invention in detail in reference to the figures. FIG. 12 is a block diagram showing a configuration of a resource allocation system (resource management device) of the fourth exemplary embodiment of the present invention.

FIG. 12 shows a resource management device 400, which receives a resource allocation request 40 with type and amount of resources that is demanded, and returns a resource allocation result 43.

The resource management device 400 is configured to include a resource monitoring unit 410 which comprehends a current state of managing resources, a resource allocation changing unit 420 which changes an allocation amount for an already allocated resource, an allocation adjustment unit 430 which determines an allocating resource amount suitable for a environment and a resource change amount for the already allocated resource, complying a demanded resource amount and the current managing resource state, and a resource allocation unit 440 which secures and allocate the allocation amount determined by the allocation adjustment unit 430 in response to the resource allocation request. That is, compared to the configuration of the first exemplary embodiment described above, the resource allocation changing unit 420 has been added to the configuration.

A setting resource amount that can be described in the resource allocation request 40 is equivalent to the resource allocation request 10.

The resource monitoring unit 410 returns the managing resource state when resource observation is requested by the allocation adjustment unit 430.

The resource allocation changing unit 420 promotes to request or notifies change resource allocation to services by seeding a resource reallocation request 41 in order to change or break-off a resource allocation for services when it receives changing request of allocated resource for running services from the allocation adjustment unit 430. If the resource allocation changing unit 420 receives resource reallocation results 42, it reallocates or reclaims allocated resources via the resource allocation unit 440

The allocation adjustment unit 430 determines a resource allocation amount based on the managing resource state and the resource allocation request 40.

Concretely, the allocation adjustment unit 430 obtains the current resource state from the resource monitoring unit 410 when the resource allocation request 40 has been received.

Next, the allocation adjustment unit 430 determines the resource allocation amount with respect to the resource allocation request 40, by an adjustment algorithm, and the allocation resource change amount with respect to a resource already provided to a service, based on the obtained current managing resource state and the resource allocation request 40.

Here, the adjustment algorithm uses an added function that determines a resource amount changing the resource already allocated to the service from a computer state, in addition to the adjustment algorithm described in the first exemplary embodiment of the present invention. That is, the allocation adjustment unit 430 determines the allocation resource amount of each service that has already started.

The allocation adjustment unit 430, when the resource allocation amount has been determined, notifies the resource allocation changing unit 420 of the allocation resource change amount, and starts changing the resource. After notification from the resource allocation unit 440 has been given that the change of the resource amount has been completed, the resource is secured via the resource allocation unit 440, and a resource allocation success and the secured resource amount or configuration information of the resource are returned as the resource allocation response 43. If the resource allocation amount could not be determined, that is, if resource requirements in the resource allocation request 40 cannot be satisfied due to a shortage of resources and so on, securing of a resource for starting a service is difficult, so the allocation adjustment unit 430 returns something that the resource cannot be secured, that is, a message of resource allocation failure, as a resource allocation response 43.

The resource allocation unit 440 secures a necessary amount from the managing resource based on the resource allocation amount determined by the allocation adjustment unit 430, and returns the amount or resource configuration information of the secured resource to the allocation adjustment unit 430.

Figure 13:
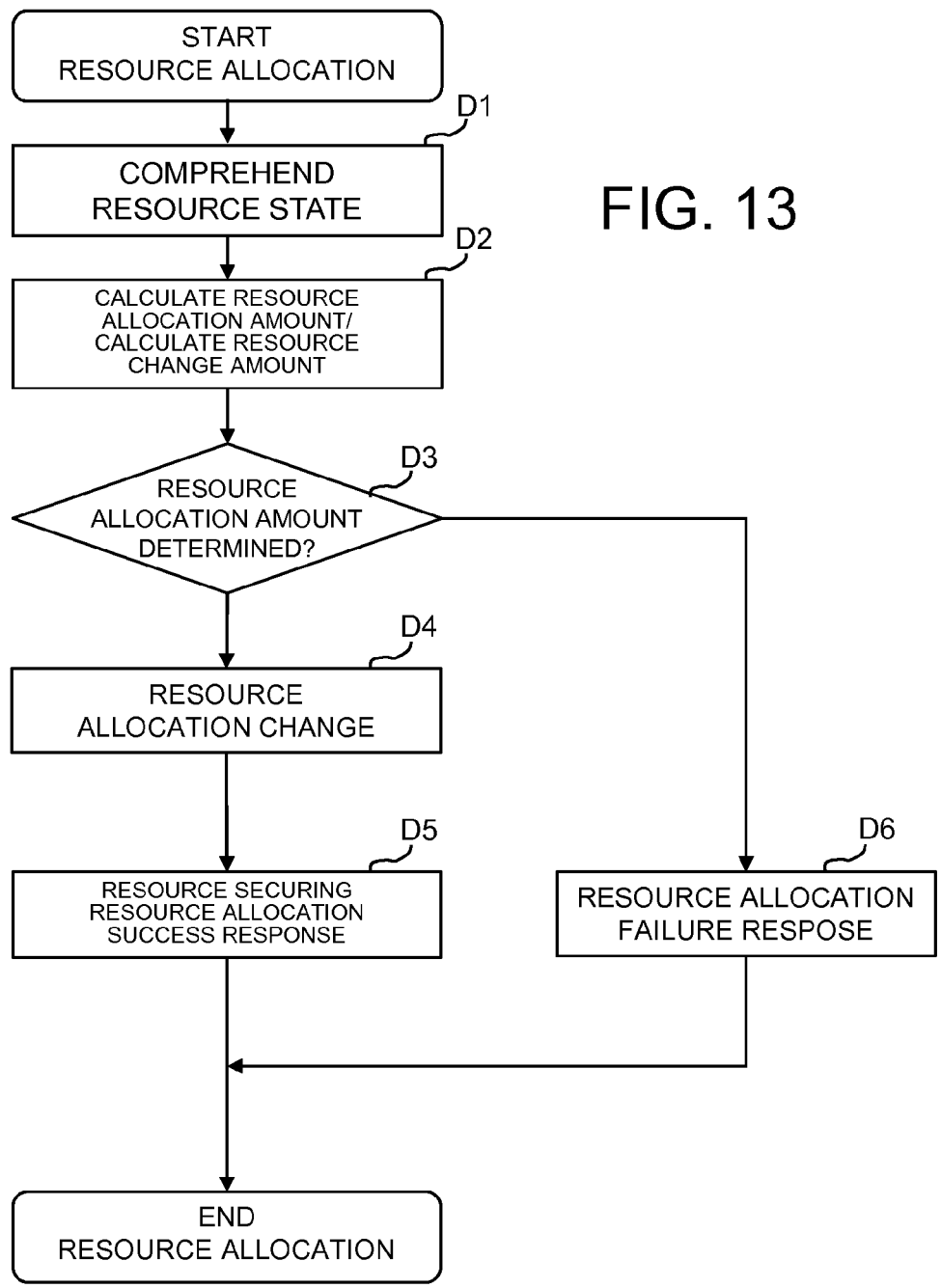
FIG. 13 is a flowchart illustrating operations of the resource allocation system (resource management device) of the fourth exemplary embodiment of the present invention.

Next, a following detailed description is given concerning operation of the resource allocation system (resource management device) of the present exemplary embodiment in reference to the figures. FIG. 13 is a flowchart illustrating operations of the abovementioned resource allocation system (resource management device).

Referring to FIG. 13, first, the allocation adjustment unit 430 receives the resource allocation request 30, an operation of resource allocation starts ("start resource allocation" in FIG. 13).

The allocation adjustment unit 430 obtains the current managing resource state via the resource monitoring unit 410 (step D1).

The allocation adjustment unit 430 uses the adjustment algorithm to respond to the current managing resource slate, and to compute the resource allocation amount satisfying the resource allocation request 40 and the resource change amount with respect to the managing resource that is already allocated (step D2).

The allocation adjustment unit 430, in cases in which the resource allocation amount has been determined, transmits the resource change amount with respect to the already allocated resource that has been determined, to the resource allocation changing unit 420, and requests a resource amount change. The resource allocation changing unit 420 notifies the allocation resource change to a service concerned with the resource change amount, and handles the resource change to the service, or stops and revokes the service. When the handling of the resource change to the service, or stopping and revoking the service are completed and the resource allocation change response 42 is received, the resource allocation changing unit 420 gives notification of the change to the allocation resource amount to the resource allocation unit 440. The resource allocation unit 440 changes the allocated resource based on the notified resource change amount, and notifies the allocation adjustment unit 430 that the resource change has been completed (Yes in step D3, step D4).

The allocation adjustment unit 430 that has received the notification, after completion of the resource change in the resource change amount, secures the resource via the resource allocation unit 440. A resource allocation success response and notification of the allocated resource are performed as the resource allocation response 43 (step D5).

On the other hand, in cases in which there is no resource allocation amount satisfying the resource allocation request 40, or in which, with the change not being possible, the computed resource allocation amount could not be secured, the allocation adjustment unit 430 gives a resource allocation failure response as the resource allocation response 43 (No in step D3, step D6).

As described above, in the present exemplary embodiment, by the allocation adjustment unit 430 obtaining the managing resource state via the resource monitoring unit 410, computing the maximum possible allocation value from the managing resource state, and adjusting with the resource allocation request 40, it is possible to perform a re-allocation of the resource including the change of the already allocated resource amount.

That is, in comparison to the abovementioned first exemplary embodiment, it is possible to determine a computed allocated amount giving consideration to all services that have been introduced.

An advantageous effect of the abovementioned present exemplary embodiment will be described by illustrating a specific example. As shown in FIG. 14, the resource management device of the present exemplary embodiment is realized within a virtual machine monitor (VMM) realizing a VM.

Here, securing memory in the VM of FIG. 14 is considered. In the machine itself of FIG. 14, an area of 4096 MB of usable memory for the VM exists. There exist 3 VMs (web) that have started a service already, and each thereof is using 1024 MB. Even if a reduction of 128 MB is performed for each VM, service continuation is possible.

Here, a VM (settlement) requiring a minimum of 1028 MB and a recommended 2048 MB requests a service to be started, and since this is for important work, it is desired to perform an operation even if other non-important VMs (=VM (web)) are changed, that is, a high priority is assigned.

Furthermore, the adjustment algorithm is developed such that "up to 80% of a held resource is used, and in cases of insufficiency, resources from other services with low priority are provided. However, only in cases in which there is still an insufficiency, an insufficient amount is supplemented using resources of 5% each time".

This is equivalent to creating, in advance, surplus area (20%=100%−80%) to the resource as much as possible, and by using this when the need arises, to include an aim of improving system serviceability.

When the VM (for settlement) starts a service, the allocation adjustment unit 430 of the resource management device of FIG. 14 receives a resource allocation request 40 requiring a recommended 2048 MB and a minimum of 1024 MB at high priority.

The allocation adjustment unit 430 requests a report of the managing resource state from the resource monitoring unit 410.

The resource monitoring unit 410 observes the managing resource state, and notifies the allocation adjustment unit 430 that 4096 MB of memory are held, and 3 normal VMs are each using 1024 MB.

The allocation adjustment unit 430 computes the resource allocation amount and the resource change amount, in accordance with the adjustment algorithm.

First, since up to 80% of the held resource is used, usable area is 3276.8 MB (=4096 MB×80%). Among this, since 3096 MB (=1024 MB×3 VMs is being used, the remaining 204.8 MB can be allocated (refer to the upper portion of FIG. 14).

However, since with 204.8 MB the minimum of 1024 MB is not reached, a resource from another service whose priority is low is provided. Thus, reductions of 128 MB are done for each VM, so that each VM has 896 MB, and the allocatable resource amount is 588.8 MB (=204.8 MB+128 MB×3 VMs) (refer to the central portion of FIG. 14).

Since even with this providing of resources, the minimum of 1024 MB is not reached, the allocation adjustment unit 430 introduces 204.8 MB (=4096 MB×5%), which is 5% of resources of all usable memory area. As a result, the allocatable resource anmount is 793.6 MB, but since this is still insufficient, resources are additionally introduced, 5% at a time. Ultimately, at a stage at which 15% (95% of the total) is introduced, usable area is 1203.2 MB, and it is possible to satisfy the resource allocation request 40 (refer to the lower stage (refer to the lower portion of FIG. 14).

The allocation adjustment unit 430, from the above computed result, determines to make changes such that 128 MB is reduced from each VM (web), and that 1203.2 MB is allocated to VM (settlement).

The allocation adjustment unit 430 that performs the abovementioned determination makes a request to the resource allocation changing unit 420 to reduce each VM (web) by 128 MB. The resource allocation changing unit 420 communicates to each VM (web) that 128 MB is to be reduced, and performs the reduction or makes preparation for the reduction. After completion of the reduction, or after completion of the preparation for the reduction has been notified from each VM (web), the resource allocation unit 440 is notified and resource allocation of relevant portions is released. The resource allocation unit 440, after release of the resource allocation, notifies the allocation adjustment unit 430 of resource change completion.

The allocation adjustment unit 430 notifies the resource allocation unit 440 that 1203.2 MB are allocated to the next VM (settlement), and the resource allocation unit 440 secures 1203.2 MB that is unused, and gives a response to the allocation adjustment unit 430.

The allocation adjustment unit 430 returns the secured resource as a resource allocation success result to a VM starting program.

By the above, staring of the VM (settlement) is possible, and the VM (settlement) operates.

In this way, by using a resource allocation change function, not only the free resource and the held resource, but also allocation amounts of a resource already allocated can be changed, from the managing resource state, and based on this change amount it is possible to determine the resource allocation amount.

Finally, referring to FIG. 15, a description will be given concerning operation and advantageous effects of the present invention realized by embedding the resource management devices (resource management devices 100 to 400) of each of the above described exemplary embodiments, in various computer environments.

A user holds a VM in a mobile storage medium (USB or the like). As conditions for starling the VM, an environment of a minimum of 400 MHz and 512 MB of memory are necessary; there are an input device and a display device for a local environment, or a network device is allocated.

A shared server used in a shared environment is present as a user access point environment, and besides this, as an individual environment 1 PC is present, and resource management devices are provided for each thereof.

When connected to respective access point environments, the VM receives a resource allotment matching an execution environment, from each resource management device, and starts.

For example, in cases in which the user connects the mobile storage medium to the shared server, a VM used by being connected from a client terminal is started with an environment leaving a CPU of 500 MHz and a memory of 512 MB. Since an input device and an output device are not present, a VM that can be started with only a remote console is started.

Furthermore, in cases in which the user connects the mobile storage medium to a PC, a VM used as a local environment is started in an environment with a CPU of 3 GHz and a memory of 2 GB, using a local input device and output device. A VMM is provided with a virtual device to be used as the local input device and output device, and by using the virtual device, it is possible to start the VM in an environment using a personal environment such as a desktop or the like.

In this way, by enabling allocation of the resource allocation amount in accordance with an execution state and a request of a service side described as a used resource condition, it is possible to make service environment management and operation management independent, and to execute operation of the service in accordance with a state of operation.

A description has been given above concerning preferred exemplary embodiments, but the technological scope of the present invention is not limited to the abovementioned exemplary embodiments, and in accordance with application of and size of a system requiring the resource management device (resource allocation system), it is possible to select appropriate implementation methods, and to add other suitable modifications. For example, each of the abovementioned exemplary embodiments can be used in a combination as appropriate.

The present invention can be used in a computer hosting service, and in particular, can be applied to provision of a computer environment in which it is possible for a user to introduce an arbitrary service. Furthermore, application is also possible to the provision of a computer environment in which the user stores a personal environment in a mobile storage medium as a VM, and operates in the same software environment using a different computer terminal.

In addition, in cases in which there are plural computer environments, such as in a cluster environment or the like, usage is also possible as a resource allocation adjustment function installed in a system with regard to a system embodiment in which a management program autonomously performs operation of a service and delegation of the service in each of the computer environments.

Referring to the program according to the third aspect, the following modes are further possible.

In a process of determining a resource amount to be allocated in response to the requested resource amount, decreasing the new amount of allocating resource(s) for an arbitrary demanded resource amount, in cases in which an used capacity or an used rate of the managing resource may be above a prescribed value when determining the new amount of allocating resource(s) complying the demanded resource amount.(mode 1)

The new amount of allocating resource(s) may be determined by also using the usage plan information for resource (s).(mode 2)

Maximum of the new amount of allocating resource(s) may be limited at a value which divided an allocatable capacity, which can be calculated by using at least one item of information among either of the usage of managing resource(s), into the number of unallocated services, which can be calculated by subtracting the number of allocated services from an upper limit of service in the usage plan information of resource(s), equally.(mode 3)

The new amount of allocating resource(s) may be calculated by distributing an allocatable capacity, which cain be calculated by using at least one item of information among either of the usage of managing resource(s), complying with a predicted resource usage amount or a predicted resource usage rate with each service set in the resource usage plan information of resource(s)he new amount of allocating resource(s) by distributing an allocatable capacity, which can be calculated by using at least one item of information among either of the usage of managing resource(s), complying with a predicted resource usage amount or a predicted resource usage rate with each service set in the resource usage plan information of resource(s),(mode 4)

A process of requesting securing of resource allocation in a second resource allocation system managing an external resource(s) (referred to below as "external managing resource (s)"), and determining the new amount of allocating resource (s) by considering a allocating state of external managing resource(s) over the remote resource securing unit may be executed in the computer.(mode 5)

A process of requesting a change of a resource amount into an allocation target in which a resource is already allocated, and determining the new amount of allocating resource(s) including a resource amount secured by above changing request may be executed in the computer.(mode 6)

A prescribed proportion of a managing resource may be set as an allocatable resource amount, and a proportion of an allocatable resource amount of the managing resource is increased when the demanded resource amount cannot be secured even if resource amount already allocated is changed. (mode 7)

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A resource allocation system comprising:
a resource monitoring unit, as executed by a processor, which measures a current capacity and/or a current usage of a resource to be managed when the resource monitoring unit receives a request that the resource is newly allocated in order to start a service;
an allocation adjustment unit, as executed by the processor, which determines an amount of the resource allocated to the service, based on the current capacity and/or current usage of the measured resource; and a resource allocation unit, as executed by the processor, which reserves the resource allocated to the service according to the amount determined by the allocation adjustment unit, wherein when the amount of the resource can be determined the allocation adjustment unit sends information of the resource reserved by the resource allocation unit to a source of the request, and when the amount of the resource can not be determined the allocation adjustment unit returns a message, which indicates a failure to reserve the resource allocated to the service, to the source of the request.

2. The resource allocation system according to claim 1, wherein the allocation adjustment unit decreases the amount of the resource allocated to the service, in cases in which an unused capacity or an unused rate of the managing resource is below a prescribed value.

3. The resource allocation system according to claim 1, wherein the allocation adjustment unit decreases the amount of the resource allocated to the service, in cases in which a used capacity or a used rate of the managing resource is above a prescribed value.

4. The resource allocation system according to claim 1, further comprising:

a usage plan setting unit, which holds usage plan information for resource(s), wherein the allocation adjustment unit determines new amount of allocating resource by also using the usage plan information for resource(s).

5. The resource allocation system according to claim 4, wherein the allocation adjustment unit limits maximum of the new amount of allocating resource at a value which divided an allocatable capacity, which can be calculated by using at least one item of information among either of the usage of managing resource(s), into the number of unallocated services, which can be calculated by subtracting the number of allocated services from an upper limit of service in the usage plan information of resources, equally.

6. The resource allocation system according to claim 4, wherein the allocation adjustment unit calculates the new amount of allocating resource(s) by distributing an allocatable capacity, which can be calculated by using at least one item of information among either of the usage of managing resource(s), complying with a predicted resource usage amount or a predicted resource usage rate with each service set in the resource usage plan information of resource(s).

7. The resource allocation system according to claim 1, further comprising:

a remote resource securing unit which requests securing of resource allocation in a second resource allocation system managing a external resource(s) (referred to below as "external managing resource(s)"), wherein the allocation adjustment unit determines the new amount of allocating resources by considering a allocating state of external managing resource over the remote resource securing unit.

8. The resource allocation system according to claim 1, further comprising:

a resource reallocation unit, which changes a resource amount already allocated, wherein the allocation adjustment unit determines the new amount of allocating resource(s) including a resource(s) released by changing an already allocated resource(s) over the resource allocation changing unit.

9. The resource allocation system according to claim 1, wherein a prescribed proportion of a managing resource is set as an allocatable resource amount, and the proportion of an allocatable resource amount of the managing resource is increased when the demanded resource amount cannot be secured even if the resource amount already allocated is changed, the proportion of an allocatable resource amount of the managing resource is increased when the demanded resource amount cannot be secured even if the resource amount already allocated is changed.

10. A resource allocation method, comprising:

monitoring, by a computer, a current capacity and/or a current usage of a resource to be managed when receiving a request that the resource is newly allocated in order to start a service; and determining an amount of the resource allocated to the service, based on the current capacity and/or the current usage of the measured resource, reserving the resource allocated to the service according to the determined amount, sending information of the resource reserved to a source of the request when the amount of the resource can be determined, and returning a message to the source of the request which indicates a failure to reserve the resource allocated to the service when the amount of the resource can not be determined.

11. The resource allocation method according to claim 10, wherein the reserving the resource allocated to the service comprises:

decreasing the amount of the resource allocated to the service, in cases in which an unused capacity or an unused rate of the managing resource is below a prescribed value.

12. The resource allocation method according to claim 10, wherein the reserving the resource allocated to the service comprises:

decreasing the amount of the resource allocated to the service, in cases in which an used capacity or an used rate of the managing resource is above a prescribed value.

13. The resource allocation method according to claim 10, wherein determining the new amount of allocating resource(s) by also using the usage plan information for resource(s).

14. The resource allocation method according to claim 13, wherein limiting maximum of the new amount of allocating resource(s) at a value which divided an allocatable capacity, which can be calculated by using at least one item of information among either of the usage of managing resource(s), into the number of unallocated services, which can be calculated by subtracting the number of allocated services from an upper limit of service in the usage plan information of resource(s), equally.

15. The resource allocation method according to claim 13, comprising:

calculating the new amount of allocating resource(s) by distributing an allocatable capacity, which can be calculated by using at least one item of information among either of the usage of managing resource(s), complying with a predicted resource usage amount or a predicted resource usage rate with each service set in the resource usage plan information of resource(s).

16. The resource allocation method according to claim 10, comprising:
   requesting securing of resource allocation in a second resource allocation system managing an external resource(s) (referred to below as "external managing resource(s)"), and
   determining the new amount of allocating resource(s) by considering a allocating state of external managing resource(s) over the remote resource securing unit.

17. The resource allocation method according to claim 10 comprising:
   requesting a change of a resource amount into an allocation target in which a resource is already allocated, and
   determining the new amount of allocating resource(s) including a resource amount secured by above changing request.

18. The resource allocation method according to claim 10, wherein
   a prescribed proportion of a managing resource is set as an allocatable resource amount, and
   a proportion of an allocatable resource amount of the managing resource is increased when the demanded resource amount cannot be secured even if resource amount already allocated is changed.

19. A non-transitory computer readable medium containing a program operated in a computer for determining an amount of a resource to be allocated, said program comprising:
   a monitoring process which measures a current capacity and/or a current usage of a resource to be managed when the receiving a request that the resource is newly allocated in order to start a service;
   an allocation adjustment process which determines an amount of the resource is determined by using at least one item of information among either of allocated to the service based on the current capacity and/or the current usage of the measured resource; and
   a resource allocation process which reserves the resource allocated to the service according to the amount determined by the allocation adjustment unit,
   wherein when the amount of the resource can be determined the program causes information of the resource reserved by the resource allocation unit to be sent to a source of the request, and when the amount of the resource can not be determined the program causes a message to be returned which indicates a failure to reserve the resource allocated to the service, to the source of the request.

20. The program according to claim 19, wherein, said allocation adjustment process comprises:
   decreasing the amount of the resource allocated to the service, in cases in which an unused capacity or an unused rate of the managing resource is below a prescribed value.

* * * * *